United States Patent
Sugitani et al.

(10) Patent No.: US 7,496,055 B2
(45) Date of Patent: Feb. 24, 2009

(54) LAYER 2 LOOP DETECTION SYSTEM

(75) Inventors: Kiichi Sugitani, Yokohama (JP);
Ryouichi Mutoh, Kawasaki (JP);
Tetsuya Nishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 743 days.

(21) Appl. No.: 10/955,961

(22) Filed: Sep. 30, 2004

(65) Prior Publication Data
US 2005/0220036 A1 Oct. 6, 2005

(30) Foreign Application Priority Data
Mar. 31, 2004 (JP) .............................. 2004-107481

(51) Int. Cl.
*H04L 12/28* (2006.01)

(52) U.S. Cl. ........................ 370/256; 370/252; 370/408; 709/252

(58) Field of Classification Search ......... 370/252–254, 370/256, 401, 408; 709/252
See application file for complete search history.

(56) References Cited

U.S. PATENT DOCUMENTS

| | | | |
|---|---|---|---|
| 5,983,371 A | | 11/1999 | Lord et al. |
| 6,515,969 B1 * | | 2/2003 | Smith .......................... 370/256 |
| 6,535,491 B2 * | | 3/2003 | Gai et al. ..................... 370/256 |
| 6,628,624 B1 * | | 9/2003 | Mahajan et al. ............. 370/256 |
| 2002/0154606 A1 * | | 10/2002 | Duncan et al. .............. 370/256 |
| 2006/0233186 A1 * | | 10/2006 | Portolani et al. ............ 370/408 |

FOREIGN PATENT DOCUMENTS

| | | |
|---|---|---|
| JP | 05-316136 | 11/1993 |
| JP | 2002-164890 | 6/2002 |
| JP | 2002-335258 | 11/2002 |

OTHER PUBLICATIONS

Seigo Yoshino, Ethernet Switch Technology -Realization of Redundancy and Loop-free. Dec. 19, 2002 NTT Data Corporation pp. 1-41.

* cited by examiner

*Primary Examiner*—Ricky Ngo
*Assistant Examiner*—Pao Sinkantarakorn
(74) *Attorney, Agent, or Firm*—Katten Muchin Rosenman LLP

(57) ABSTRACT

A layer 2 loop detection apparatus includes a unit recognizing a topology of an L2 network at normal time by collecting MIB information including information concerning ports of a plurality of L2 switches from the plurality of L2 switches through SNMP communication; a unit discriminating, based on a topology recognition processing, a blocking port for traffic blocking and a disable port under a port disable state each set under a Spanning Tree Protocol (STP); a unit setting each of the blocking port and the disable port as a monitoring point and periodically monitoring a state thereof; and a unit performing detection of an L2 loop by re-collecting a part of the MIB information from the plurality of L2 switches through SNMP communication and re-recognizing the topology of the L2 network, the detection of the L2 loop detection being triggered by a change of a state of one of the blocking port and the disable port.

20 Claims, 21 Drawing Sheets

SYS LAYER 2 LOOP DETECTION SYSTEM OF FIRST EMBODIMENT

FIG. 4

| TARGET BRIDGE IP | PORT | Stp Priority | BaseBridge Address | Stp Root Port | Stp Port | Stp Port State | Stp Designated Bridge | Stp Designated Port |
|---|---|---|---|---|---|---|---|---|
| 192.168.10.10 | 1 | 8032 | 00:00:00:00:00:01 | NONE | 1 | 5 | 00:00:00:00:00:01 | 8001 |
|  | 2 | 8032 |  |  | 2 | 5 | 00:00:00:00:00:01 | 8002 |
| 192.168.10.20 | 1 | 8032 | 00:00:00:00:00:02 | 1 | 1 | 5 | 00:00:00:00:00:01 | 8002 |
|  | 2 | 8032 |  |  | 2 | 5 | 00:00:00:00:00:02 | 8002 |
| 192.168.10.30 | 1 | 8032 | 00:00:00:00:00:03 | 1 | 1 | 5 | 00:00:00:00:00:01 | 8001 |
|  | 2 | 8032 |  |  | 2 | 5 | 00:00:00:00:00:03 | 8002 |
| 192.168.10.40 | 1 | 8032 | 00:00:00:00:00:04 | 1 | 1 | 5 | 00:00:00:00:00:02 | 8002 |
|  | 2 | 8032 |  |  | 2 | 2 | 00:00:00:00:00:03 | 8002 |

FIG. 7

| TARGET BRIDGE IP | PORT | Stp Priority | BaseBridge Address | Stp Root Port | Stp Port | Stp Port State | Stp Designated Bridge | Stp Designated Port |
|---|---|---|---|---|---|---|---|---|
| 192.168.10.10 | 1 | 8032 | 00:00:00:00:00:01 | NONE | 1 | 5 | 00:00:00:00:00:01 | 8001 |
|  | 2 |  |  |  | 2 | 5 | 00:00:00:00:00:01 | 8002 |
| 192.168.10.20 | 1 | 8032 | 00:00:00:00:00:02 | 1 | 1 | 5 | 00:00:00:00:00:01 | 8002 |
|  | 2 |  |  |  | 2 | 5 | 00:00:00:00:00:02 | 8002 |
| 192.168.10.30 | 1 | 8032 | 00:00:00:00:00:03 | 1 | 1 | 5 | 00:00:00:00:00:01 | 8001 |
|  | 2 |  |  |  | 2 | 1 |  |  |
| 192.168.10.40 | 1 | 8032 | 00:00:00:00:00:04 | 1 | 1 | 5 | 00:00:00:00:00:02 | 8002 |
|  | 2 |  |  |  | 2 | 1 |  |  |

FIG. 10

| TARGET BRIDGE IP | PORT | Stp Priority | BaseBridge Address | Stp Root Port | Stp Port | Stp Port State | Stp Designated Bridge | Stp Designated Port |
|---|---|---|---|---|---|---|---|---|
| 192.168.10.10 | 1 | 8032 | 00:00:00:00:00:01 | NONE | 1 | 5 | 00:00:00:00:00:01 | 8001 |
|  | 2 |  |  |  | 2 | 5 | 00:00:00:00:00:01 | 8002 |
| 192.168.10.20 | 1 | 8032 | 00:00:00:00:00:02 | 1 | 1 | 5 | 00:00:00:00:00:01 | 8002 |
|  | 2 |  |  |  | 2 | 5 | 00:00:00:00:00:02 | 8002 |
| 192.168.10.30 | 1 | 8032 | 00:00:00:00:00:03 | 1 | 1 | 5 | 00:00:00:00:00:01 | 8001 |
|  | 2 |  |  |  | 2 | 5 | 00:00:00:00:00:03 | 8002 |
|  | 3 |  |  |  | 3 | 1 |  |  |
| 192.168.10.40 | 1 | 8032 | 00:00:00:00:00:04 | 1 | 1 | 5 | 00:00:00:00:00:02 | 8002 |
|  | 2 |  |  |  | 2 | 2 | 00:00:00:00:00:03 | 8002 |
|  | 3 |  |  |  | 3 | 1 |  |  |

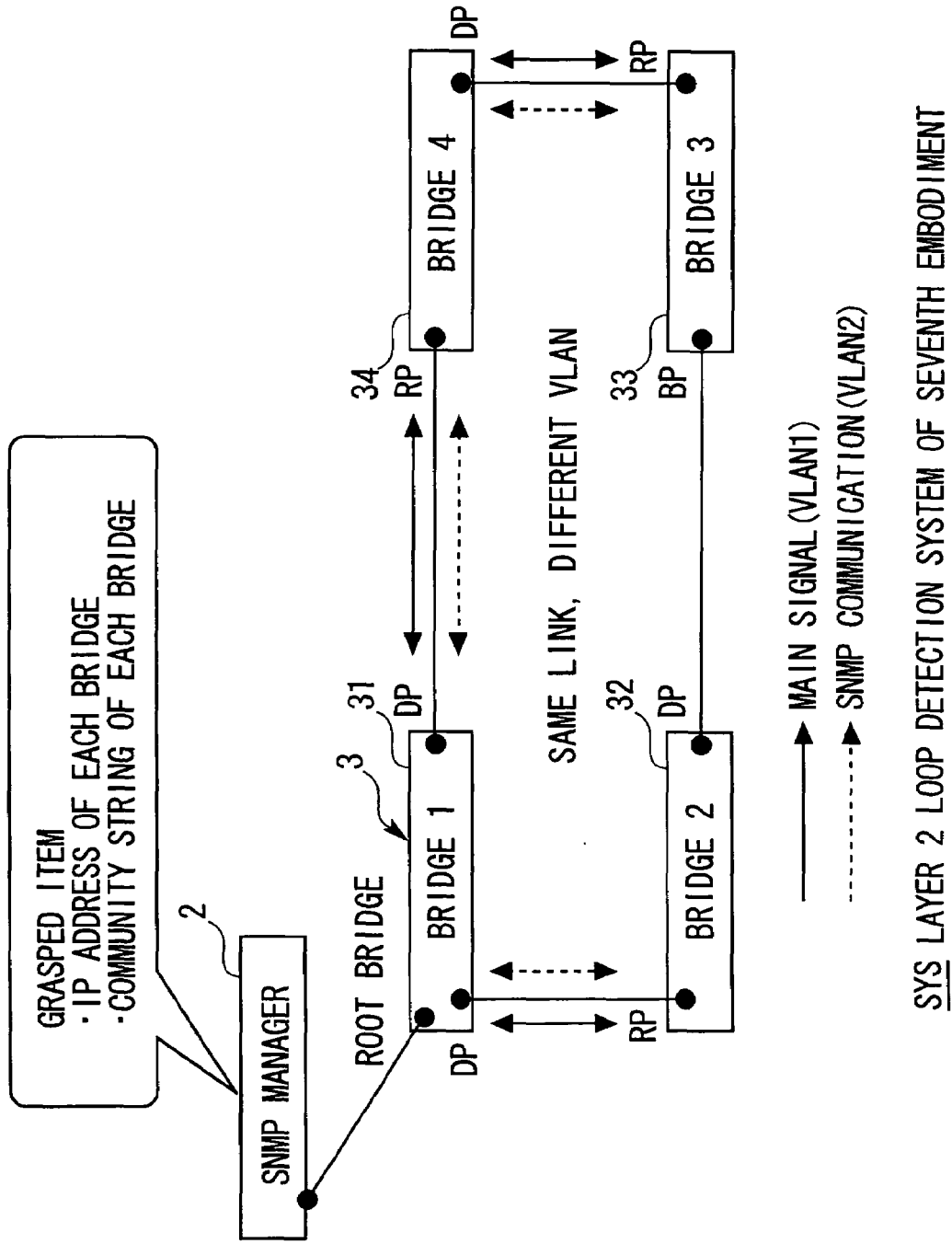

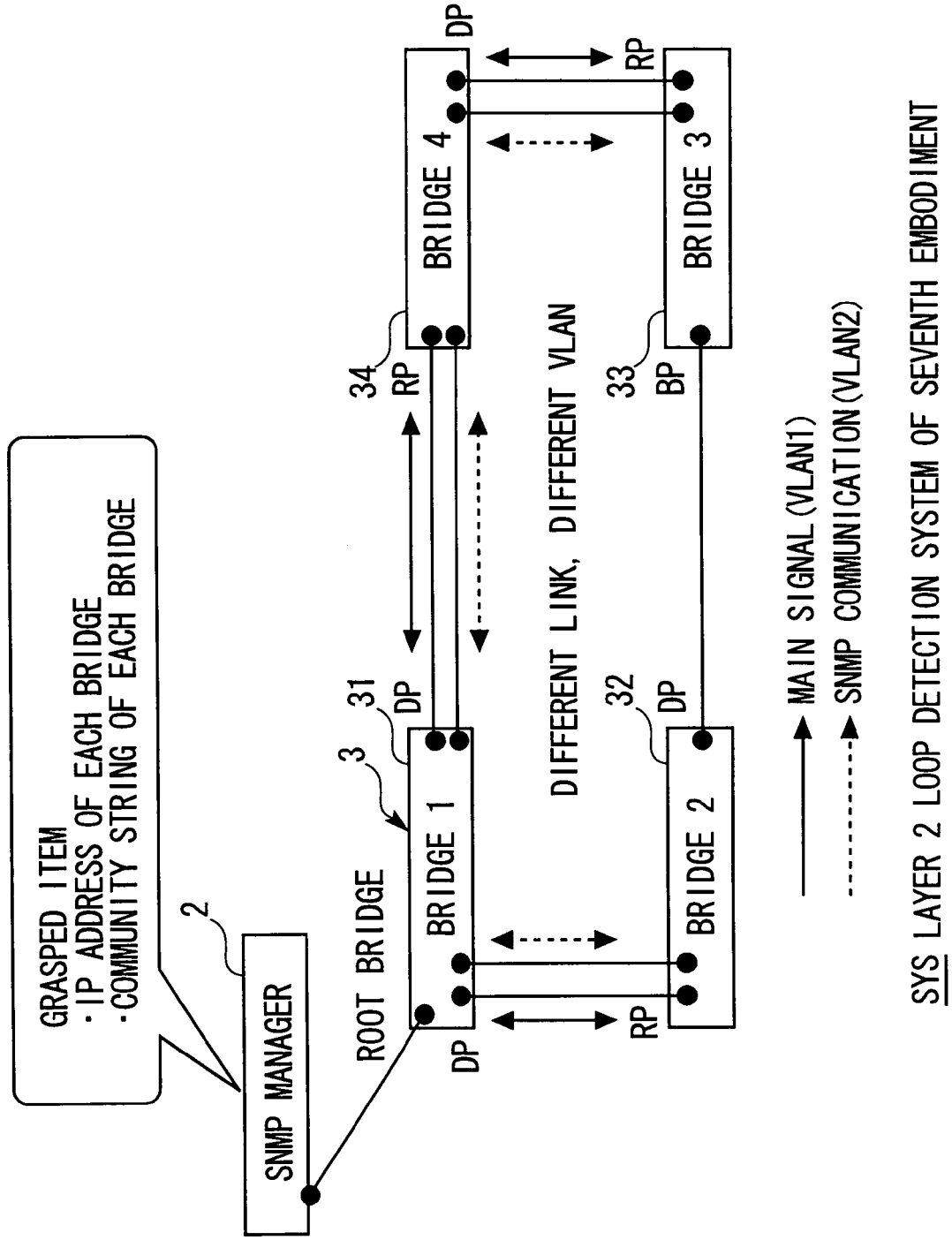

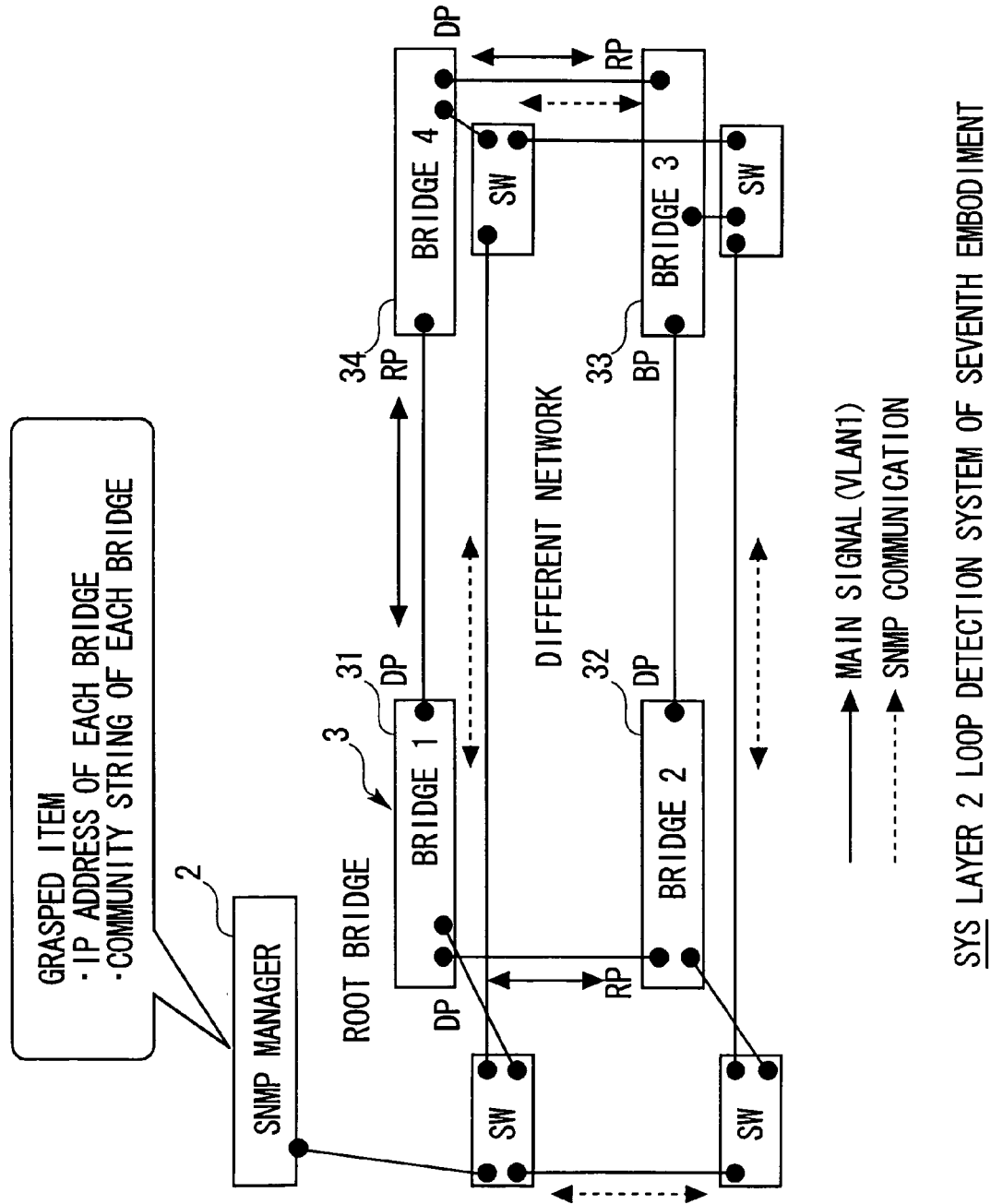

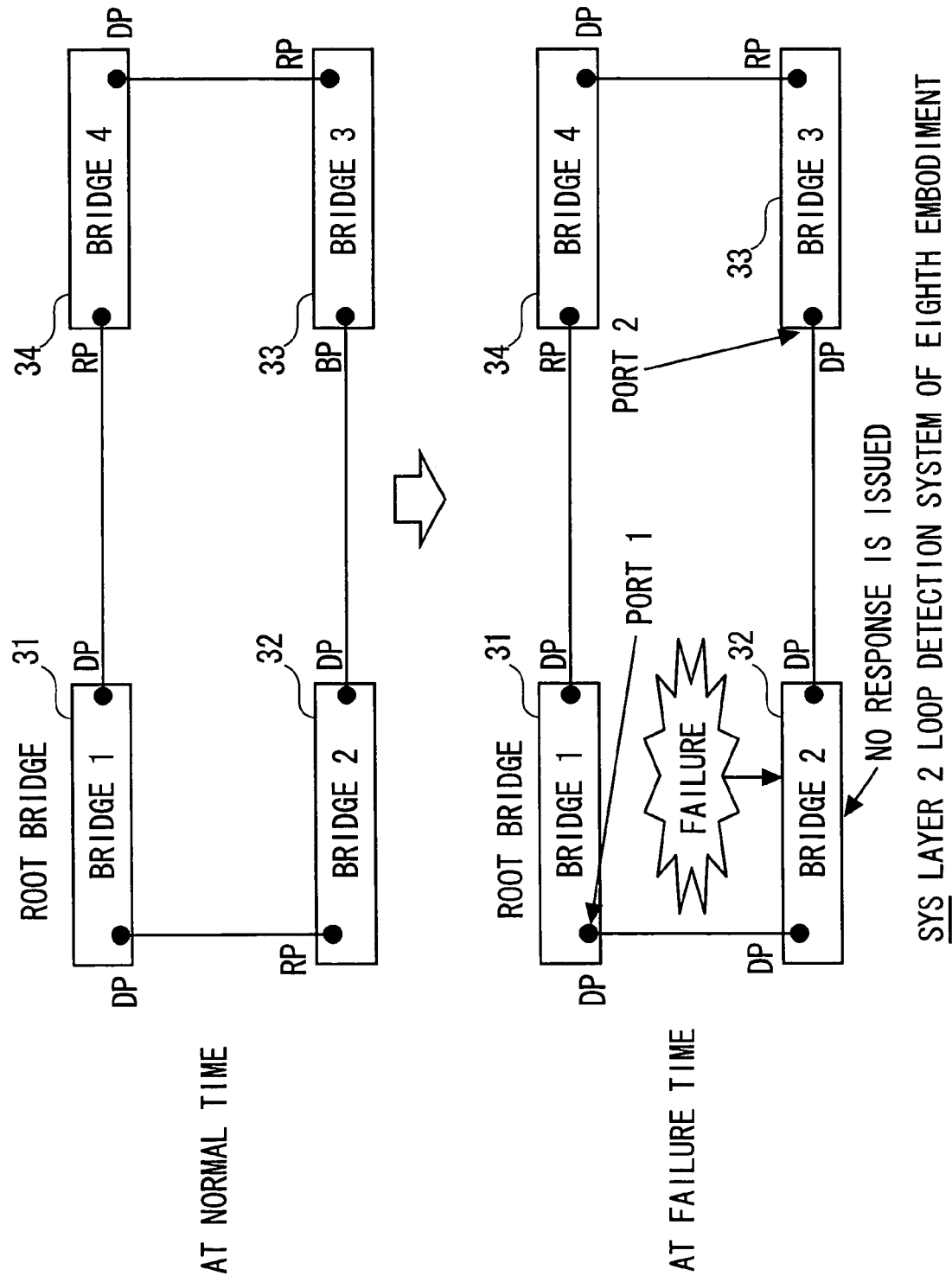

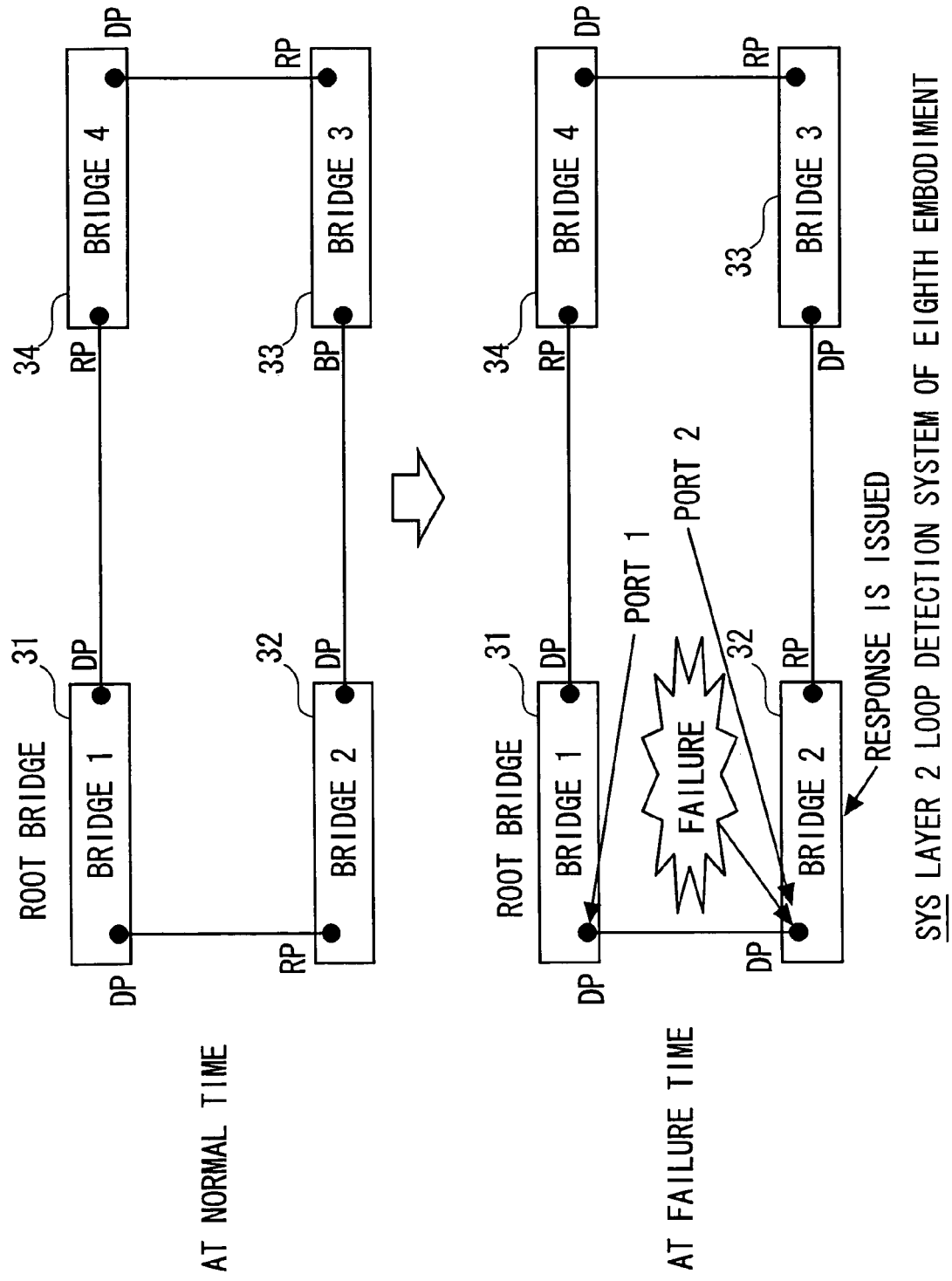

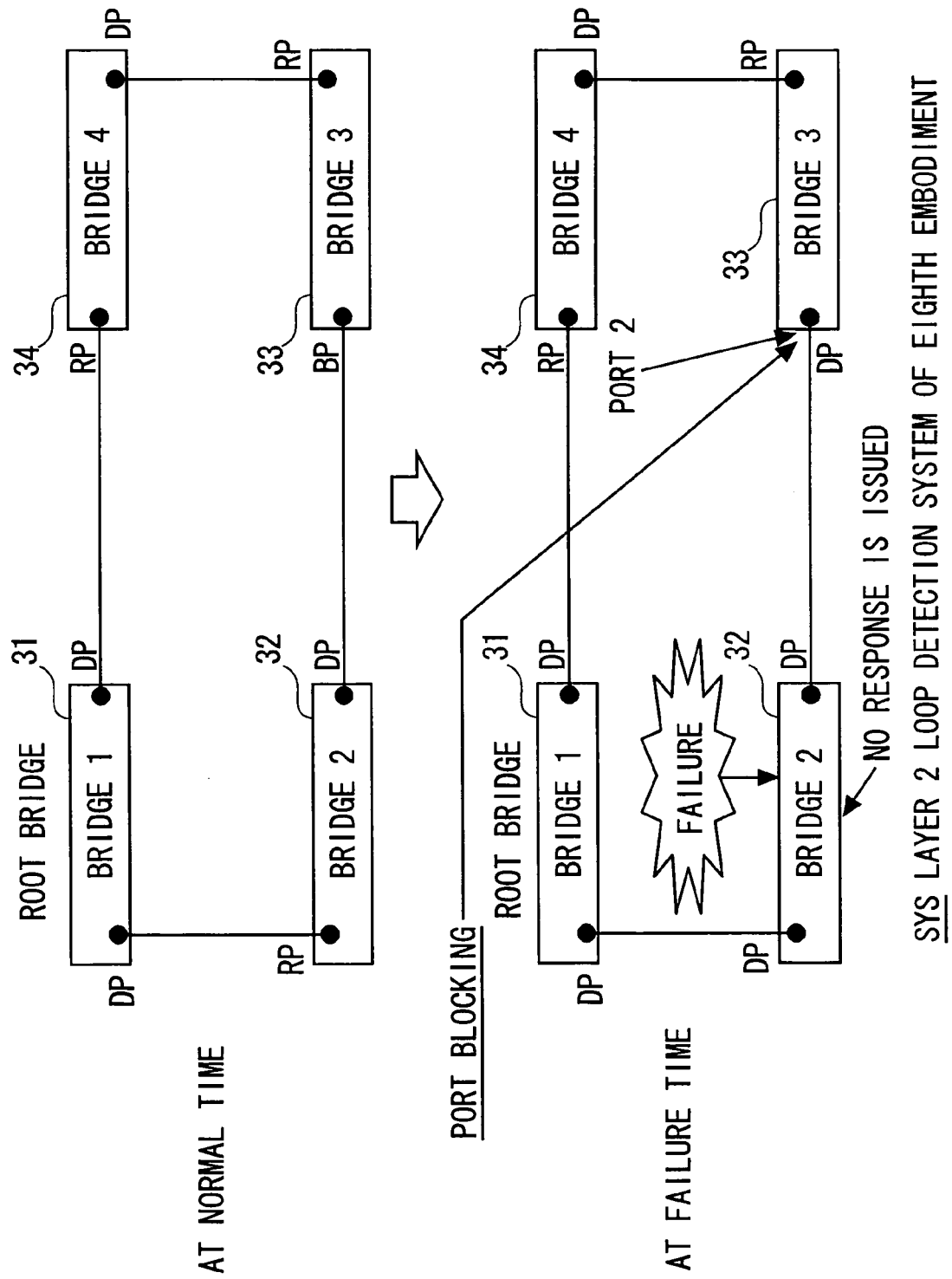

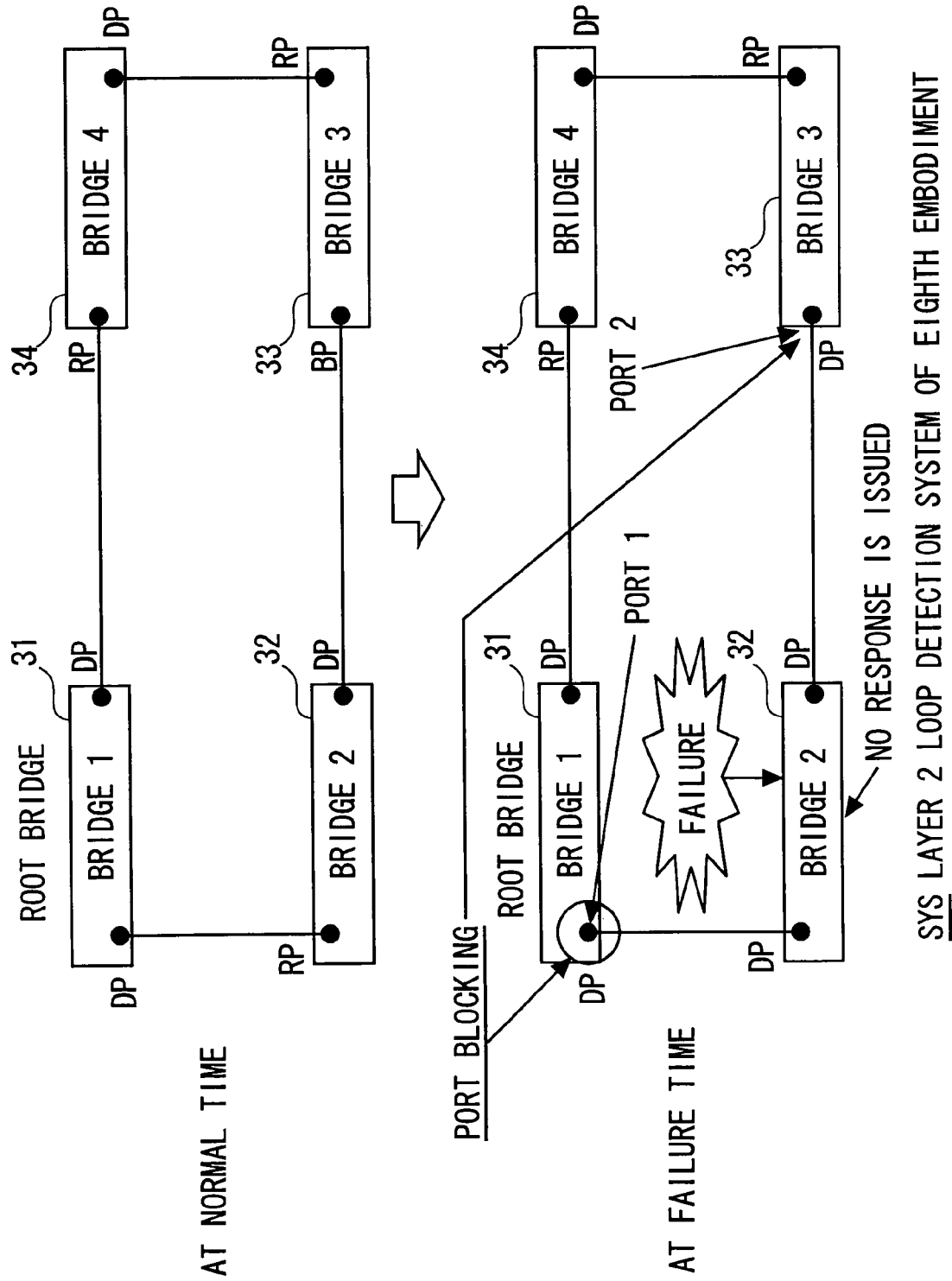

LAYER 2 LOOP DETECTION SYSTEM

BACKGROUND OF THE INVENTION

The present invention relates to a layer 2 loop detection system that enables layer 2 loop detection by an Simple Network Management Protocol (SNMP) manager that monitoring target is a layer 2 network having multiple layer 2 switches.

In a layer 2 network for constructing an enterprise network or the like, as one technique of securing redundancy of the network through loop (layer 2 loop) elimination, the Spanning Tree Protocol (STP) standardized by Institute of Electrical and Electronics Engineers (IEEE) 802.1D is caused to run.

This is because Media Access Control (MAC) frames have no equivalent of the Time to Live (TTL) under the Internet Protocol (IP), so that if a network is looped, this results in a situation where the MAC frames are infinitely circulated at a location at which the network is looped.

Under the STP, by exchanging packets for monitoring so-called "Bridge Protocol Data Unit (BPDU)" between adjacent nodes (layer 2 switches), the location at which the network is looped is detected and a port called "blocking port" that blocks the MAC frames (traffic blocking port) is created, thereby logically blocking the loop.

With the technique utilizing the STP, the occurrence of a layer 2 loop is avoided, although there are cases where the STP is collapsed due to, for instance, a CPU failure of a bridge that is a layer 2 switch. Once the STP is collapsed, the blocking port is lost, so that a loop occurrence becomes unavoidable. As a result, the layer 2 network is placed under a congestion state, which may lead to a failure such as response degradation or meltdown.

When such a failure occurs, bridge log overwriting occurs or communication becomes impossible when the communication is performed using the Simple Network Management Protocol (SNMP) so that there also occurs a situation where it is impossible to identify the location of the failure.

The following are related arts to the present invention.
[Patent Document 1]
Japanese Patent Laid-Open Publication No. 05-316136
[Patent Document 2]
Japanese Patent Laid-Open Publication No. 2002-335258
[Patent Document 3]
Japanese Domestic Laid-Open Publication No. 2001-509657
[Patent Document 4]
Japanese Patent Laid-Open Publication No. 2002-164890
[Non-Patent Document 1]
http://www.nic.ad.jp/ja/materials/iw/2002/proceeding/T18-1.pdf

SUMMARY OF THE INVENTION

The present invention has an object to provide a technique that enables reliable layer 2 loop detection by an SNMP manager that monitoring target is a layer 2 network having multiple layer 2 switches.

To attain the above object, according to the present invention, there is provided a layer 2 loop detection apparatus using an Simple Network Management Protocol (SNMP) manager that monitoring target is a layer 2 network having a plurality of layer 2 switches, including: a unit recognizing a topology of the layer 2 network at normal time by collecting Management Information Base (MIB) information including information concerning ports of the plurality of layer 2 switches from the plurality of layer 2 switches through SNMP communication; a unit discriminating, based on the topology recognition processing, a blocking port for traffic blocking set under a Spanning Tree Protocol (STP); a unit setting the discriminated blocking port as a monitoring point and periodically monitoring a state thereof; and a unit performing detection of a layer 2 loop by re-collecting a part of the MIB information from the plurality of layer 2 switches through SNMP communication and re-recognizing the topology of the layer 2 network, the detection of the layer 2 loop being triggered by a change of the state of the blocking port.

With the above arrangement, in the layer 2 loop detection apparatus, the MIB information on the blocking port and the disable port is periodically monitored as a state of the monitoring point and the detection of the layer 2 loop is triggered by transfer of traffic from one of the blocking port and the disable port.

Further, in the layer 2 loop detection apparatus, the MIB information on the blocking port and the disable port is periodically monitored as a state of the monitoring point and the detection of the layer 2 loop is triggered by a change of a port status of one of the blocking port and the disable port.

Further, in the layer 2 loop detection apparatus, at a time when a part of the MIB information is re-collected through the SNMP communication, if the MIB information cannot be collected from one of the plurality of layer 2 switches, a location of the layer 2 loop is detected by detecting that every port connected to the layer 2 switch is set as a designated port.

Further, in the layer 2 loop detection apparatus, at a time when a part of the MIB information is re-collected through the SNMP communication, a location of the layer 2 loop is estimated by detecting a link that both ends are each set as a designated port.

According to the present invention, it becomes possible to significantly reduce the number of man-hours and the labor cost incurred by a layer 2 network failure. In addition, it also becomes possible to realize swift failure recovery and to prevent the occurrence of a failure.

Also, according to the present invention, it becomes possible to identify the location of a failure by identifying a location at which ports at both ends of a certain link, out of links constructed with the STP, are designated ports and are paired.

Further, according to the present invention, it becomes possible to identify the location of a failure by identifying that every opposing port connected to a layer 2 switch from which no response of SNMP communication is received is a designated port.

Other objects, features, and advantages of the present invention will become apparent from the following description taken in conjunction with the accompanying drawings and the appended claims.

BRIEF DESCRIPTION OF THE DRAWINGS

FIG. 4 is a diagram showing a list of MIB information in the system according to the first embodiment of the present invention;

FIG. 7 is a diagram showing a list of MIB information in the system of the second embodiment according to the present invention;

FIG. 10 is a diagram showing a list of MIB information in the system according to the third embodiment of the present invention;

FIG. 15 is a block diagram showing a configuration of a second layer 2 loop detection system according to the seventh embodiment of the present invention;

FIG. 16 is a block diagram showing a configuration of a third layer 2 loop detection system according to the seventh embodiment of the present invention;

FIG. 17 is a block diagram showing a configuration of a fourth layer 2 loop detection system according to the seventh embodiment of the present invention;

FIG. 18 is a block diagram showing a configuration of a first layer 2 loop detection system according to an eighth embodiment of the present invention;

FIG. 19 is a block diagram showing a configuration of a second layer 2 loop detection system according to the eighth embodiment of the present invention;

FIG. 20 is a block diagram showing a configuration of a third layer 2 loop detection system according to the eighth embodiment of the present invention; and FIG. 21 is a block diagram showing a configuration of a fourth layer 2 loop detection system according to the eighth embodiment of the present invention.

DETAILED DESCRIPTION OF THE PREFERRED EMBODIMENTS

The present invention will now be described in more detail with reference to the accompanying drawings. The drawings illustrate preferred embodiments of the present invention. However, it is possible to carry out the present invention in many different forms and it should not be construed that the present invention is limited to the embodiments described in the specification. If anything, these embodiments are provided in order to thoroughly and completely disclose the present invention and to sufficiently inform persons skilled in the art of the scope of the present invention.

First Embodiment (System Configuration)

Figure 1:
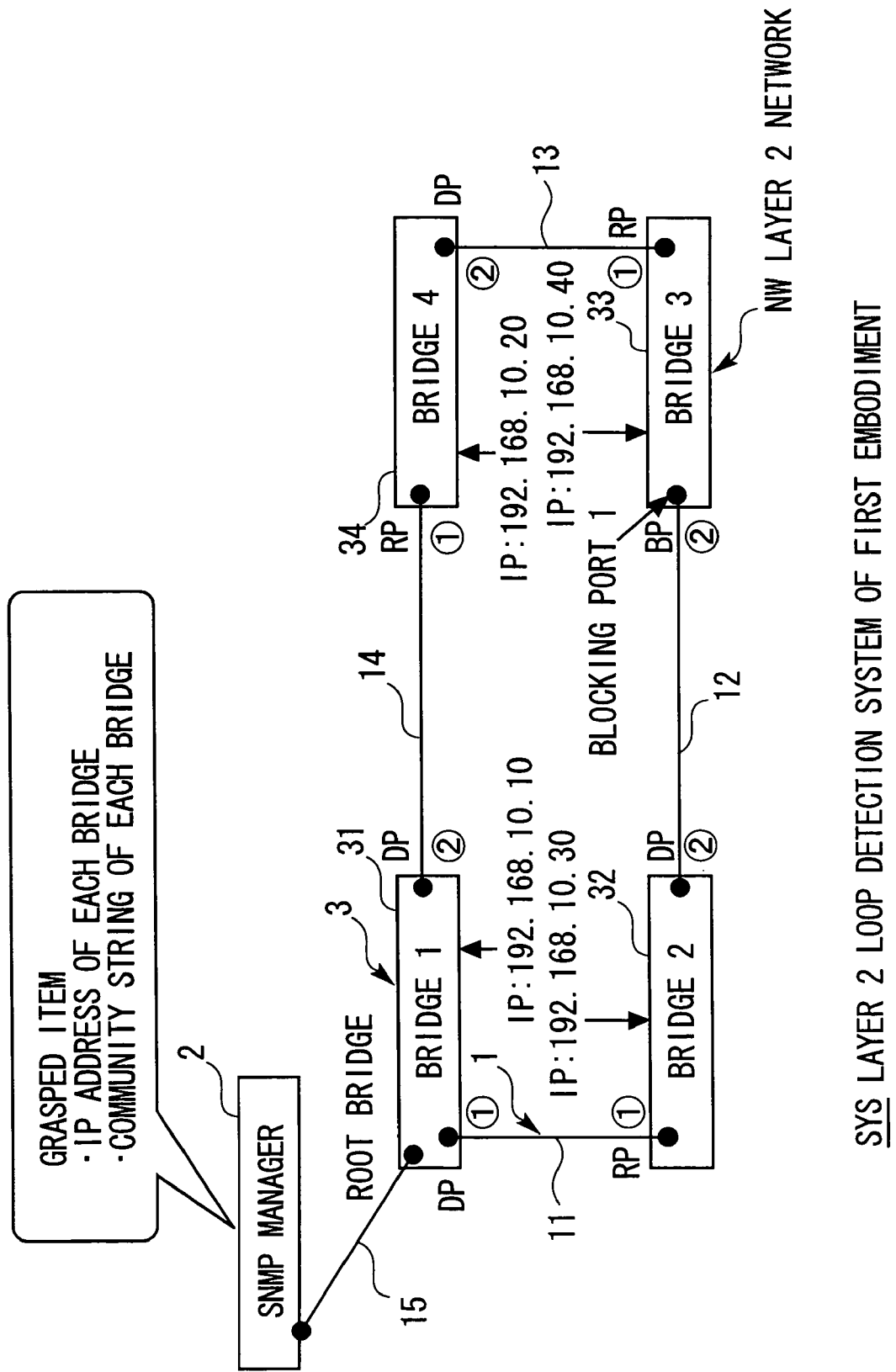
FIG. 1 is a block diagram showing a configuration of a layer 2 loop detection system according to a first embodiment of the present invention.

Referring to FIG. 1 that shows a configuration of a system in a first embodiment of the present invention, a layer 2 loop detection system SYS has the manager/agent structure under the Simple Network Management Protocol (SNMP), includes an SNMP manager 2 and multiple agents 3 (31, 32, 33, 34) that are connected to Local Area Networks (LANs) 1 (11, 12, 13, 14, 15) (such as Ethernet networks (Ethernet: registered trademark)) serving as Internet Protocol (IP) networks, and constructs a system having a network management (monitoring) function.

Figure 2:
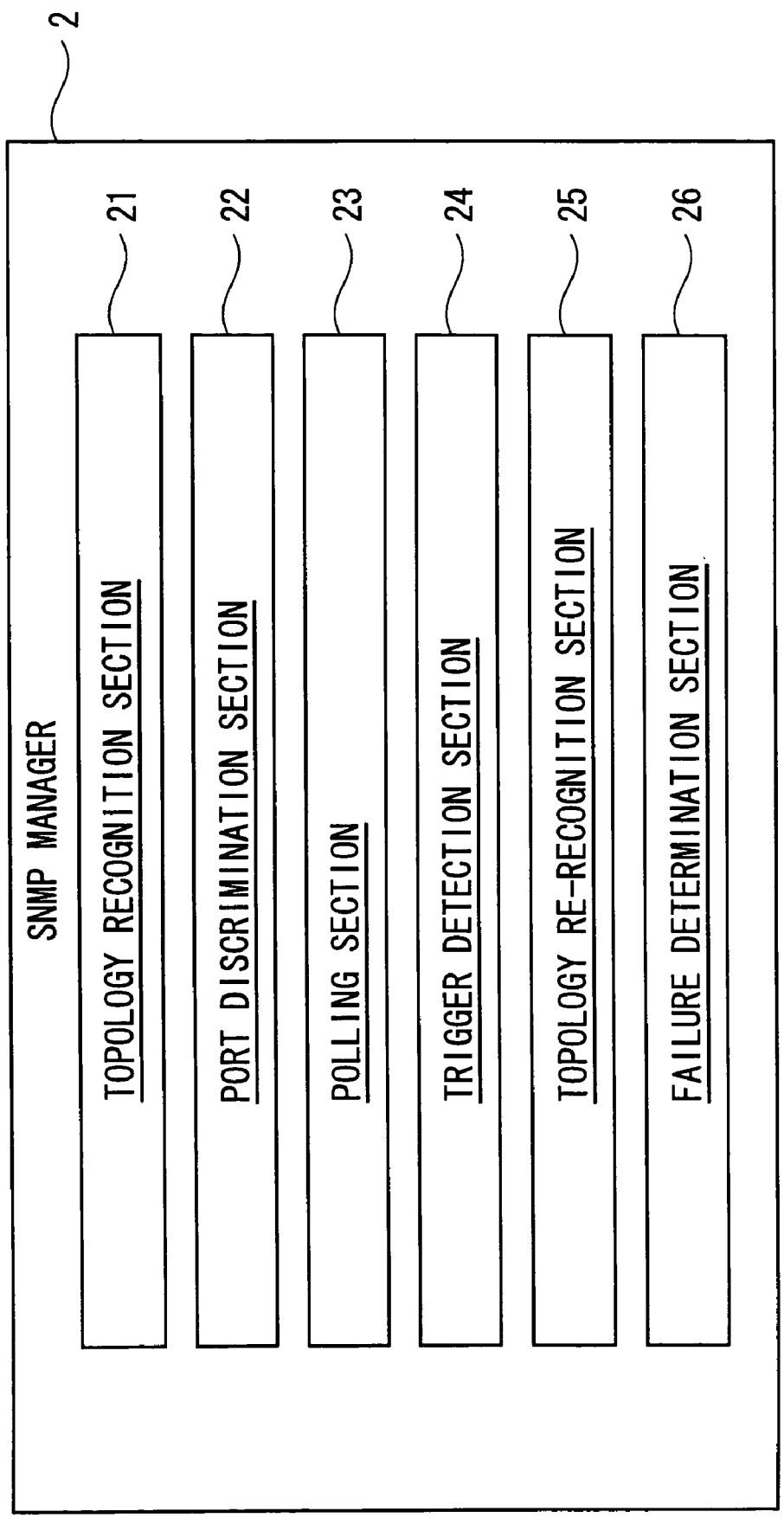
FIG. 2 is a block diagram showing a functional configuration of an SNMP manager.
Figure 3:
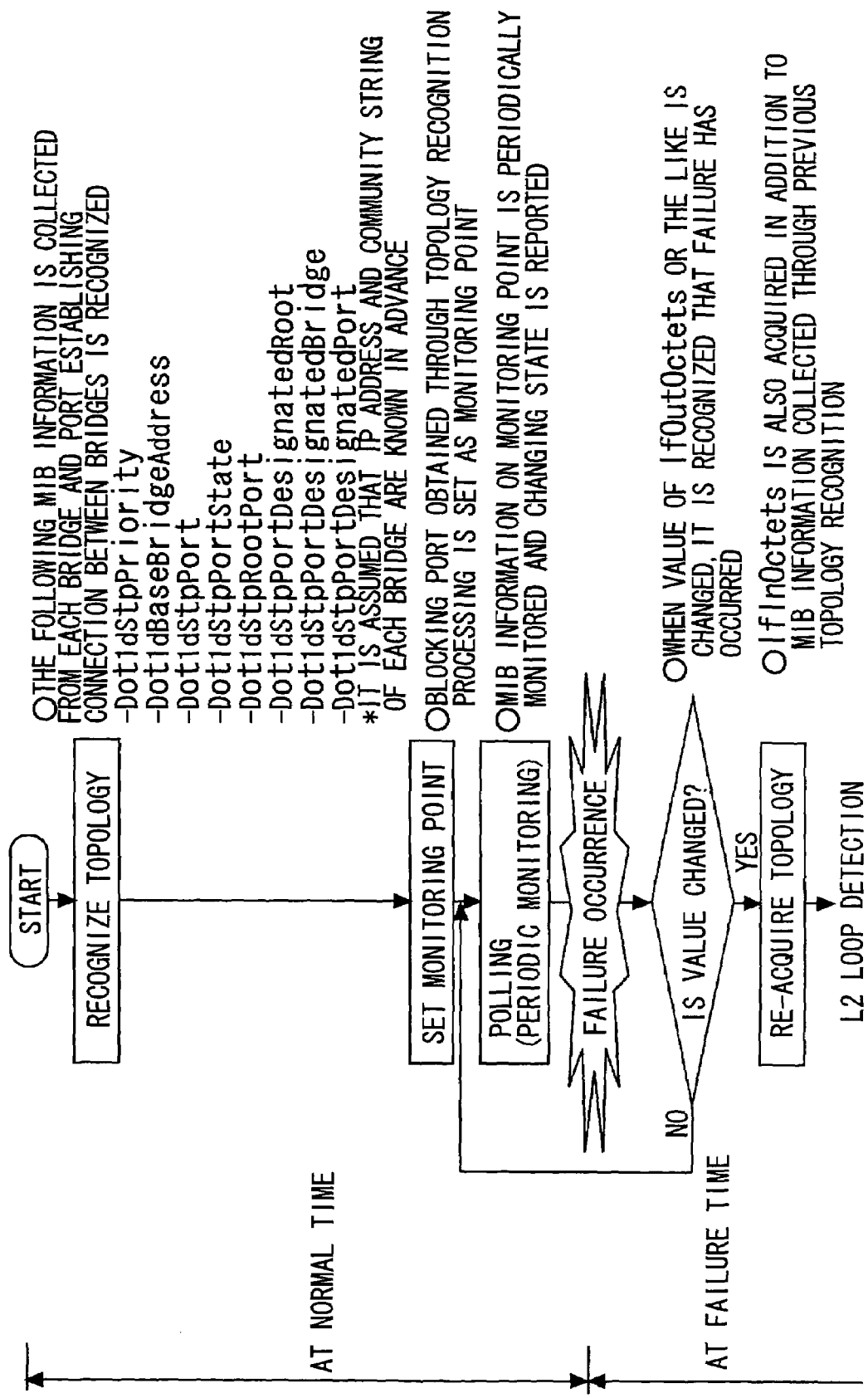
FIG. 3 is an explanatory diagram of L2 loop detection processing in the system according to the first embodiment of the present invention.

Strictly speaking, the SNMP manager (hereinafter simply referred to as the "manager" in some cases) 2 on a management (monitoring) station is an apparatus (such as a personal computer (PC)), on which the SNMP manager has been installed, and constructs a layer 2 (L2) loop detection apparatus in this example. The SNMP manager 2 monitors the LANs 1 and the multiple agents 3 on a layer 2 (L2) network NW that is a management (monitoring) target system. As FIG. 2 shows a detailed functional construction of the SNMP manager 2, the SNMP manager 2 includes a topology recognition section 21, a port discrimination section 22, a polling section 23, a trigger detection section 24, a topology re-recognition section 25, and a failure determination section 26.

Strictly speaking, the multiple agents 3 constituting the L2 network NW are each an apparatus, on which an agent has been installed, and respectively correspond to bridges (1 to 4) 31, 32, 33, and 34 serving as layer 2 (L2) switches in this example. The bridge 31 and the bridge 32 are physically connected to each other through the LAN 11, the bridge 32 and the bridge 33 are physically connected to each other through the LAN 12, the bridge 33 and the bridge 34 are physically connected to each other through the LAN 13, and the bridge 34 and the bridge 31 are physically connected to each other through the LAN 14. Also, the bridge 31 and the SNMP manager 2 are physically connected to each other through the LAN 15. However, as will be described in detail later, the bridge 32 and the bridge 33 are not logically connected to each other through the LAN 12.

The manager 2 in this layer 2 loop detection system SYS is arranged on the LAN 15 connected to the bridge 31, although the manager 2 may also be accommodated in another IP network connected to the LAN 15.

(System Operation/Layer 2 Loop Detection Processing)

Next, an operation example in the layer 2 loop detection system SYS of the first embodiment of the present invention shown in FIG. 1 will be described with reference to FIGS. 1, 2, 3, and 4.

In the layer 2 loop detection system SYS having the manager/agent structure described above, the SNMP is a protocol running on the User Datagram Protocol (UDP) and used to exchange management information between the management station for network management and the management target system. Under this SNMP, in the system SYS of the first embodiment, the SNMP manager 2 on the management station sends a processing request (command) to each bridge 31 to 34 on the L2 network NW that is the management target system, and each bridge 31 to 34 informs the manager 2 of management information (response).

By means of such a request/response-based function of the topology recognition section 21, the SNMP manager 2 acquires, in advance, the IP addresses of the monitoring target bridges 31 to 34 (that is, addresses used at the time of designation of a bridge with which it is desired to perform SNMP communication) and community strings of the monitoring target bridges 31 to 34 (that is, character strings (passwords) used to perform SNMP communication with the bridges). In the example shown in FIGS. 1 and 4, the IP addresses of the bridges 31 to 34 are "192. 168. 10. 10", "192. 168. 10. 30", "192. 168. 10. 40", and "192. 168. 10. 20", respectively.

Also, the request/response exchange is performed between the manager 2 and the bridges 31 to 34 in a form of exchange of SNMP messages, although a trap that is an autonomous message among messages under the SNMP is a UDP message that is autonomously (uni-directionally) sent from each bridge 31 to 34 to the manager 2 and is used to inform the manager 2 of the states (congestion, failure, and the like) of the LANs 11 to 14, the states of the bridges 31 to 34, and the like. How this autonomous message "trap" is used will be described in detail later.

In the L2 network NW for constructing an enterprise network or the like, as one technique of securing redundancy of the network by eliminating a loop (layer 2 loop) in which Media Access Control (MAC) frames are infinitely circulated, the Spanning Tree Protocol (STP) standardized by IEEE 802.1D is caused to run.

Under the STP, packets for monitoring called "Bridge Protocol Data Unit (BPDU)" are exchanged between the bridges 31 to 34 that are each an L2 switch and, when a location at which the network is looped is detected, a port called "blocking port (BP)" that blocks the MAC frames (traffic blocking port) is created, thereby logically blocking the loop. Through this operation, the occurrence of an L2 loop is avoided.

Also, the STP is a protocol that creates a network configuration (topology) having a tree structure where one bridge called "root bridge" is set as a root. The L2 network NW determines the root bridge through exchange of configuration BPDUs between the bridges 31 to 34 under the STP.

By causing the STP to run in the L2 network NW, only one port of each bridge 32 to 34 that is close to the root bridge (bridge 31) (that is, the root) is set as a root port (RP). Also, a port in each LAN 11 to 14 having the minimum root path cost is set as a designated (selected) port (DP) in the LAN. The ports of the root bridge are "0" in root path cost and therefore they each become a designated port DP.

The root ports RP and the designated ports DP are set under a port status (state) "Forwarding" and other ports are set under a port status "Blocking".

As a result, in the L2 network NW, the bridge 31 becomes a root bridge where its first port and second port are each set as a designated port DP. Claim that in FIG. 1, each port number is indicated using a circled number. Also, the first ports of the bridges 32, 33, and 34 each become a root port RP and the second ports of the bridges 32 and 34 each become a designated port DP. The second port of the bridge 33 is originally a designated port DP, although it is set as a blocking port (1) BP for the sake of avoidance of the occurrence of an L2 loop.

The topology recognition section 21 of the SNMP manager 2 collects Management Information Base (MIB) information from the bridges 31 to 34 constituting the L2 network NW that is the monitoring target through the bridge 31 (third port thereof) and the LAN 15 by performing SNMP communication.

Here, the MIB information collected by the topology recognition section 21 includes information described in the following script languages (1) to (10) and concerning the ports establishing connections between the bridges 31 to 34.
(1) dot1dStpPriority: the priority of an SNMP communication target bridge
(2) dot1dBaseBridgeAddress: the MAC address of the SNMP communication target bridge
(3) dot1dStpPort: the ID of each port belonging to the STP in the SNMP communication target bridge
(4) dot1dStpPortState: the status of the port (where the value of this status is set at one of (1) Disable, (2) Blocking, (3) Listening, (4) Learning, and (5) Forwarding)
(5) dot1dStpRootPort: the ID of a root port of the SNMP communication target bridge
(6) dot1dStpPortDesignatedRoot: the ID of a root bridge of the STP to which the port of the SNMP communication target belongs
(7) dot1dStpPortDesignatedBridge: the ID of a designated bridge of the port of the SNMP communication target
(8) dot1dStpPortDesignatedPort: the ID of a designated port of the port of the SNMP communication target
(9) ifInOctets: the total number of bytes received by the port of the SNMP communication target
(10) ifOutOctets: the total number of bytes sent from the port of the SNMP communication target Also, a list of the MIB information collected by the topology recognition section 21 is shown in FIG. 4. As shown in FIG. 4, the topology recognition section 21 stores the collected MIB information in a storage section (hard disk) (not shown) by setting the IP addresses and the port numbers of the bridges 31 to 34 as key information.

Based on the collected MIB information, the topology recognition section 21 analyzes that bridge ports having the same values of (7) dot1dStpPortDesignatedBridge and (8) dot1dStpPortDesignatedPort exist adjacent to each other.

Also, the topology recognition section 21 grasps the STP status of each port of the bridges 31 to 34 based on (4) dot1dStpPortState. Among ports having the Forwarding status "5", each port having a port number "1" indicated by (5) dot1dStpRootPort is analyzed as a root port RP and each port having another port number is analyzed as a designated port DP. The topology recognition section 21 analyzes the topology of the L2 network NW through these processing.

Next, the port discrimination section 22 discriminates the blocking port (1) BP with reference to the STP port status "2" obtained through the topology recognition processing by the topology recognition section 21 and sets this blocking port (1) BP as a monitoring point. In this example, the second port of the bridge 33 is set as the monitoring point.

The polling section 23 periodically (cyclically) monitors and collects the MIB information on the blocking port (1) BP corresponding to the set monitoring point and informs the trigger detection section 24 of a changing state. When a change of the MIB information on the blocking port (1) BP is inputted from the polling section 23, the trigger detection section 24 is triggered to recognize that a failure has occurred and inform the topology re-recognition section 25 of the failure occurrence.

On being informed of the failure occurrence by the trigger detection section 24, the topology re-recognition section 25 re-acquires the MIB information ((4) dot1dStpPortState, (5) dot1dStpRootPort, and (9) ifInOctets in this example) from the bridges 31 to 34 of the L2 network NW that is the monitoring target and updates the STP status of each port, thereby re-analyzing the topology and performing L2 loop detection.

On being informed of this L2 loop detection by the topology re-recognition section 25, the failure determination section 26 recognizes that a failure has occurred in the L2 network NW.

Next, processing by the polling section 23 and the trigger detection section 24 of the SNMP manager 2 will be described in a more specific manner.

In the series of L2 loop detection processing described above, the polling section 23 collects values of (10) ifOutOctets as the MIB information for periodically monitoring the blocking port (1) BP corresponding to the monitoring point and informs the trigger detection section 24 of a changing state so that when traffic (packet) that is equal to or more than an arbitrary threshold value determined by the SNMP manager 2 in advance is transferred from the blocking port (1) BP, the trigger detection section 24 is triggered to recognize that a failure has occurred. After recognizing that a failure has occurred, the trigger detection section 24 informs the topology re-recognition section 25 of the failure occurrence. Claim that it is required to set this threshold value so that the trigger detection section 24 will never be triggered by traffic outputted from the blocking port (1) BP at normal time of the L2 network NW.

Alternatively, in the series of L2 loop detection processing described above, the polling section 23 collects values of (4) dot1dStpPortState as the MIB information for periodically monitoring the blocking port (1) BP corresponding to the monitoring point and informs the trigger detection section 24 of a changing state so that when the port status of the blocking port (1) BP is changed from "Blocking", the trigger detection section 24 is triggered to recognize that a failure has occurred. After recognizing that a failure has occurred, the trigger detection section 24 informs the topology re-recognition section 25 of the failure occurrence.

Still alternatively, in the series of L2 loop detection processing described above, it is also possible to set the polling section 23 and the trigger detection section 24 so that when there occurs an event other than a change of the MIB information for periodically monitoring the blocking port (1) BP corresponding to the monitoring point, the trigger detection section 24 is triggered to recognize that a failure has occurred in the L2 network NW.

More specifically, the polling section 23 and the trigger detection section 24 may be set so that when a topology change trap, out of various autonomous messages (traps) sent by the respective bridges 31 to 34, is received, the trigger detection section 24 is triggered to recognize that a failure has occurred. This topology change trap is generated at the time when the port status in each bridge 31 to 34 changes from "Learning" to "Forwarding" or from "Forwarding" to "Blocking".

Aside from this, the polling section 23 and the trigger detection section 24 may be set so that when a new root trap, out of various autonomous messages (traps) sent by the respective bridges 31 to 34, is received, the trigger detection section 24 is triggered to recognize that a failure has occurred. This new root trap is generated at the time when a new root port RP is selected in each bridge.

Second Embodiment (System Configuration)

Figure 5:
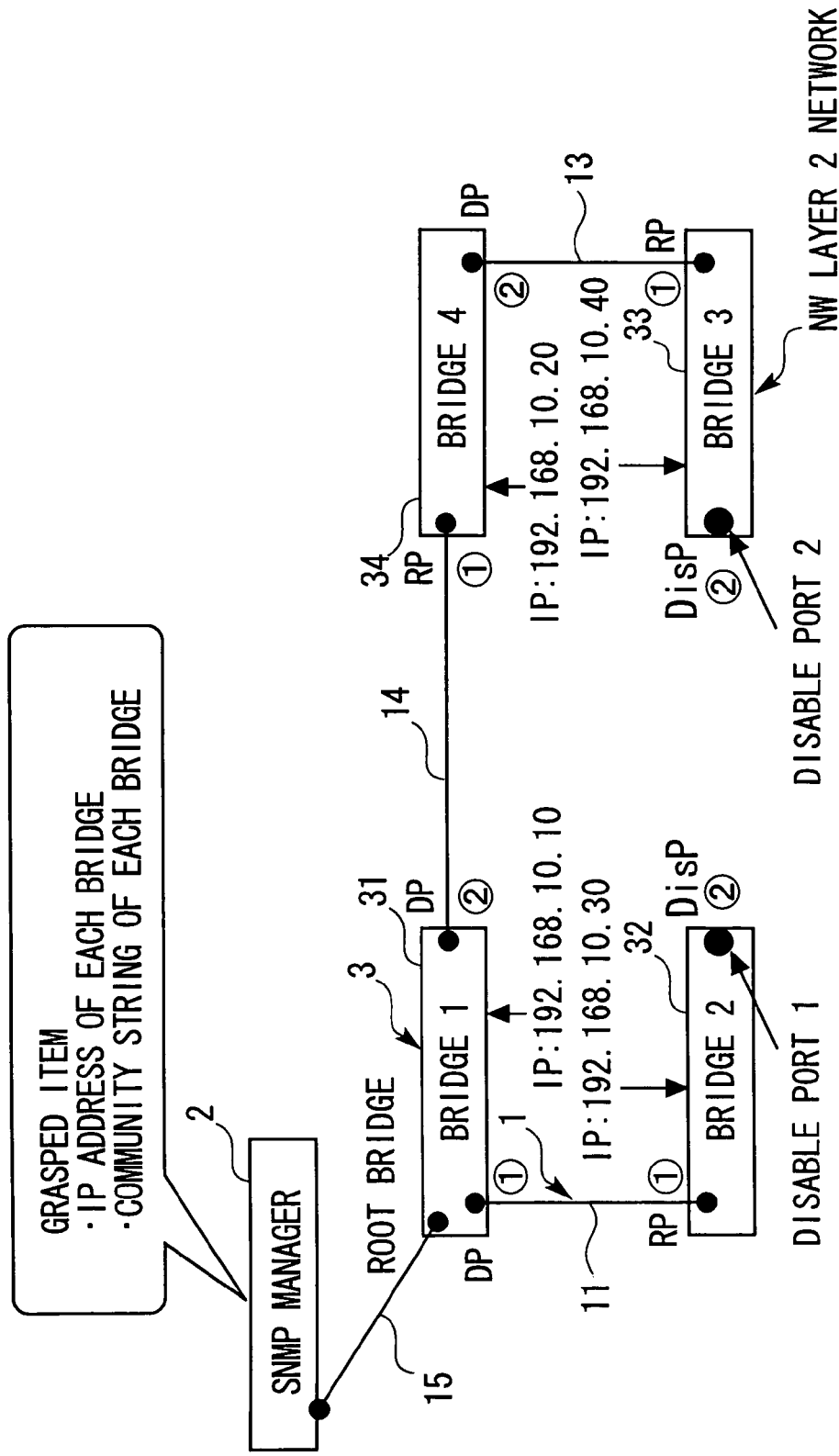
FIG. 5 is a block diagram showing a configuration of a layer 2 loop detection system according to a second embodiment of the present invention.
Figure 6:
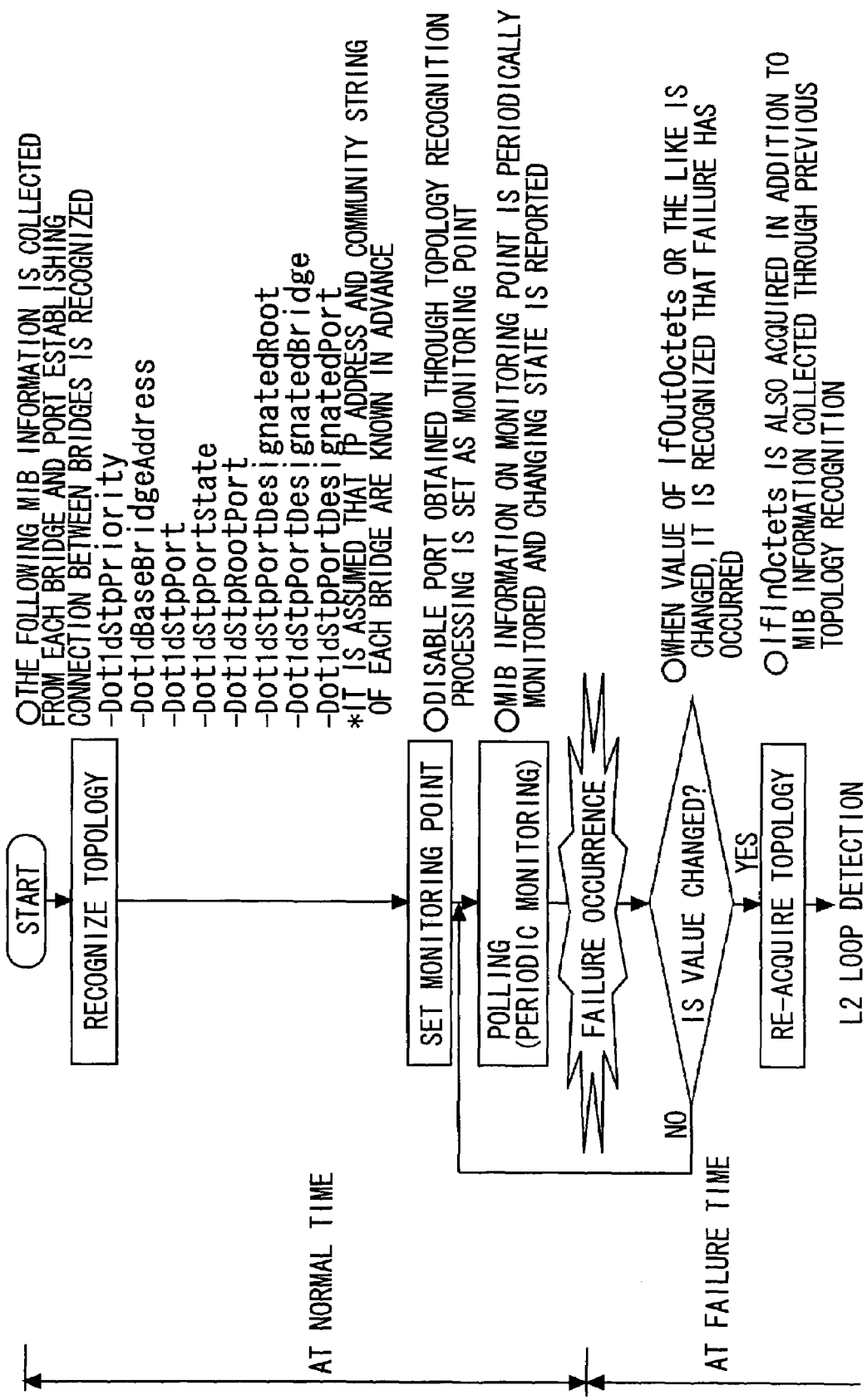
FIG. 6 is an explanatory diagram of L2 loop detection processing in the system according to the second embodiment of the present invention.

Referring to FIG. 5 that shows a configuration of a system in a second embodiment of the present invention, like the system SYS of the first embodiment described above, a layer 2 loop detection system SYS of this embodiment has the manager/agent structure under the SNMP, includes an SNMP manager 2 and multiple agents 3 (31, 32, 33, 34) that are connected to Local Area Networks (LANs) 1 (11, 12, 13, 14, 15) (such as Ethernet networks (Ethernet: registered trademark)) serving as IP networks, and constructs a system having a network management (monitoring) function.

Strictly speaking, the SNMP manager 2 on a management (monitoring) station is an apparatus (such as a personal computer (PC)), on which the SNMP manager has been installed, and constructs an L2 loop detection apparatus in this example. The SNMP manager 2 monitors the LANs 1 and the multiple agents 3 on an L2 network NW that is a management (monitoring) target system. As FIG. 2 shows a detailed functional construction of the SNMP manager 2, the SNMP manager 2 includes a topology recognition section 21, a port discrimination section 22, a polling section 23, a trigger detection section 24, a topology re-recognition section 25, and a failure determination section 26.

Strictly speaking, the multiple agents 3 constituting the L2 network NW are each an apparatus, on which an agent has been installed, and respectively correspond to bridges (1 to 4) 31, 32, 33, and 34 serving as L2 switches in this example. The bridge 31 and the bridge 32 are physically connected to each other through the LAN 11, the bridge 32 and the bridge 33 are physically connected to each other through the LAN 12, the bridge 33 and the bridge 34 are physically connected to each other through the LAN 13, and the bridge 34 and the bridge 31 are physically connected to each other through the LAN 14. Also, the bridge 31 and the SNMP manager 2 are physically connected to each other through the LAN 15. However, as will be described in detail later, the bridge 32 and the bridge 33 are not logically connected to each other through the LAN 12.

The manager 2 in this layer 2 loop detection system SYS is arranged on the LAN 15 connected to the bridge 31, although the manager 2 may also be accommodated in another IP network connected to the LAN 15.

(System Operation/Layer 2 Loop Detection Processing)

Next, an operation example in the layer 2 loop detection system SYS of the second embodiment of the present invention shown in FIG. 5 will be described with reference to FIGS. 2, 5, 6, and 7.

In the layer 2 loop detection system SYS having the manager/agent structure described above, the SNMP is a protocol running on the UDP and used to exchange management information between the management station for network management and the management target system. Under this SNMP, in the system SYS of the second embodiment, the SNMP manager 2 on the management station sends a processing request (command) to each bridge 31 to 34 on the L2 network NW that is the management target system, and each bridge 31 to 34 informs the manager 2 of management information (response).

By means of such a request/response-based function of the topology recognition section 21, the SNMP manager 2 acquires, in advance, the IP addresses of the monitoring target bridges 31 to 34 (that is, addresses used at the time of designation of a bridge with which it is desired to perform SNMP communication) and community strings of the monitoring target bridges 31 to 34 (that is, character strings (passwords) used to perform SNMP communication with the bridges). In the example shown in FIGS. 5 and 7, the IP addresses of the bridges 31 to 34 are "192. 168. 10. 10", "192. 168. 10. 30", "192. 168. 10. 40", and "192. 168. 10. 20", respectively.

Also, the request/response exchange is performed between the manager 2 and the bridges 31 to 34 in a form of exchange of SNMP messages, although a trap that is an autonomous message among messages under the SNMP is a UDP message that is autonomously (uni-directionally) sent from each bridge 31 to 34 to the manager 2 and is used to inform the manager 2 of the states (congestion, failure, and the like) of the LANs 11 to 14, the states of the bridges 31 to 34, and the like. How this autonomous message "trap" is used will be described in detail later.

In the L2 network NW for constructing an enterprise network or the like, as one technique of securing redundancy of the network by eliminating a loop (layer 2 loop) in which MAC frames are infinitely circulated, the Spanning Tree Protocol (STP) standardized by IEEE 802.1D is caused to run.

Under the STP, packets for monitoring called "BPDU" are exchanged between the bridges 31 to 34 that are each an L2 switch and, when a location at which the network is looped is detected, a port called "blocking port (BP)" that blocks the MAC frames (traffic blocking port) is created, thereby logically blocking the loop. Through this operation, the occurrence of an L2 loop is avoided.

Also, the STP is a protocol that creates a network configuration (topology) having a tree structure where one bridge called "root bridge" is set as a root. The L2 network NW determines the root bridge through exchange of configuration BPDUs between the bridges 31 to 34 under the STP.

By causing the STP to run in the L2 network NW, only one port of each bridge 32 to 34 that is close to the root bridge (bridge 31) (that is, the root) is set as a root port (RP). Also, a port in each LAN 11 to 14 having the minimum root path cost is set as a designated port (DP) in the LAN. The ports of the root bridge are "0" in root path cost and therefore they each become a designated port DP.

The root ports RP and the designated ports DP are set under a port status (state) "Forwarding" and other ports are set under a port status "Blocking" or "Disable".

As a result, in the L2 network NW, the bridge 31 becomes a root bridge where its first port and second port are each set as a designated port DP. Claim that in FIG. 5, each port number is indicated using a circled number. Also, the first ports of the bridges 32, 33, and 34 each become a root port RP and the second port of the bridge 34 becomes a designated port DP. While a second port of the bridge 33 is originally a blocking port BP for the sake of avoidance of the occurrence of an L2 loop, it is set as a disable port (DisP) together with a second port of the bridge 32 in this example.

The topology recognition section 21 of the SNMP manager 2 collects MIB information from the bridges 31 to 34 constituting the L2 network NW that is the monitoring target through the bridge 31 (third port thereof) and the LAN 15 by performing SNMP communication. Like in the first embodiment, the MIB information collected by the topology recognition section 21 includes the information (1) to (10) described above.

Also, a list of the MIB information collected by the topology recognition section 21 is shown in FIG. 7. As shown in this drawing, the topology recognition section 21 stores the collected MIB information in a storage section (hard disk) (not shown) by setting the IP addresses and the port numbers of the bridges 31 to 34 as key information.

Based on the collected MIB information, the topology recognition section 21 analyzes that bridge ports having the same values of (7) dot1dStpPortDesignatedBridge and (8) dot1dStpPortDesignatedPort exist adjacent to each other.

Also, the topology recognition section 21 grasps the STP status of each port of the bridges 31 to 34 based on (4) dot1dStpPortState. Among ports having the Forwarding status "5", each port having a port number "1" indicated by (5) dot1dStpRootPort is analyzed as a root port RP and each port having another port number is analyzed as a designated port DP. The topology recognition section 21 analyzes the topology of the L2 network NW through these processing.

Next, the port discrimination section 22 discriminates a blocking port BP with reference to the STP port status "2" obtained through the topology recognition processing by the topology recognition section 21; however, no blocking port BP exists in the configuration of this L2 network NW. Therefore, the port discrimination section 22 discriminates the disable ports (1, 2) DisP under a port disabled state with reference to the port status "1" and sets each of these ports as a monitoring point. In this example, the second port of the bridge 32 and the second port of the bridge 33 are each set as the monitoring point.

The polling section 23 periodically (cyclically) monitors and collects the MIB information on the disable ports (1, 2) DisP corresponding to the set monitoring point and informs the trigger detection section 24 of a changing state. When a change of the MIB information on one of the disable ports (1, 2) DisP is inputted from the polling section 23, the trigger detection section 24 is triggered to recognize that a failure has occurred and inform the topology re-recognition section 25 of the failure occurrence.

On being informed of the failure occurrence by the trigger detection section 24, the topology re-recognition section 25 re-acquires the MIB information ((4) dot1dStpPortState, (5) dot1dStpRootPort, and (9) ifInOctets in this example) from the bridges 31 to 34 of the L2 network NW that is the monitoring target and updates the STP status of each port, thereby re-analyzing the topology and performing L2 loop detection.

On being informed of this L2 loop detection by the topology re-recognition section 25, the failure determination section 26 recognizes that a failure has occurred in the L2 network NW.

Next, processing by the polling section 23 and the trigger detection section 24 of the SNMP manager 2 will be described in a more specific manner.

In the series of L2 loop detection processing described above, the polling section 23 collects values of (10) ifOutOctets as the MIB information for periodically monitoring the disable ports (1, 2) DisP corresponding to the monitoring point and informs the trigger detection section 24 of a changing state so that when traffic (packet) is transferred from one of the disable ports (1, 2) DisP, the trigger detection section 24 is triggered to recognize that a failure has occurred. After recognizing that a failure has occurred, the trigger detection section 24 informs the topology re-recognition section 25 of the failure occurrence. Claim that a traffic amount is obtained through calculation of a difference from its previous traffic amount by the polling section 23.

Alternatively, in the series of L2 loop detection processing described above, the polling section 23 collects values of (4) dot1dStpPortState as the MIB information for periodically monitoring the disable ports (1, 2) DisP corresponding to the monitoring point and informs the trigger detection section 24 of a changing state so that when the port status of one of the disable ports (1, 2) DisP is changed from "Disable", the trigger detection section 24 is triggered to recognize that a failure has occurred. After recognizing that a failure has occurred, the trigger detection section 24 informs the topology re-recognition section 25 of the failure occurrence.

Still alternatively, in the series of L2 loop detection processing described above, it is also possible to set the polling section 23 and the trigger detection section 24 so that when there occurs an event other than a change of the MIB information for periodically monitoring the disable ports (1, 2) DisP corresponding to the monitoring point, the trigger detection section 24 is triggered to recognize that a failure has occurred in the L2 network NW.

More specifically, the polling section 23 and the trigger detection section 24 may be set so that when a topology change trap, out of various autonomous messages (traps) sent by the respective bridges 31 to 34, is received, the trigger detection section 24 is triggered to recognize that a failure has occurred. This topology change trap is generated at the time when the port status in each bridge 31 to 34 changes from "Learning" to "Forwarding" or from "Forwarding" to "Blocking".

Aside from this, the polling section 23 and the trigger detection section 24 may be set so that when a new root trap, out of various autonomous messages (traps) sent by the respective bridges 31 to 34, is received, the trigger detection section 24 is triggered to recognize that a failure has occurred. This new root trap is generated at the time when a new root port RP is selected in each bridge.

Third Embodiment (System Configuration)

Figure 8:
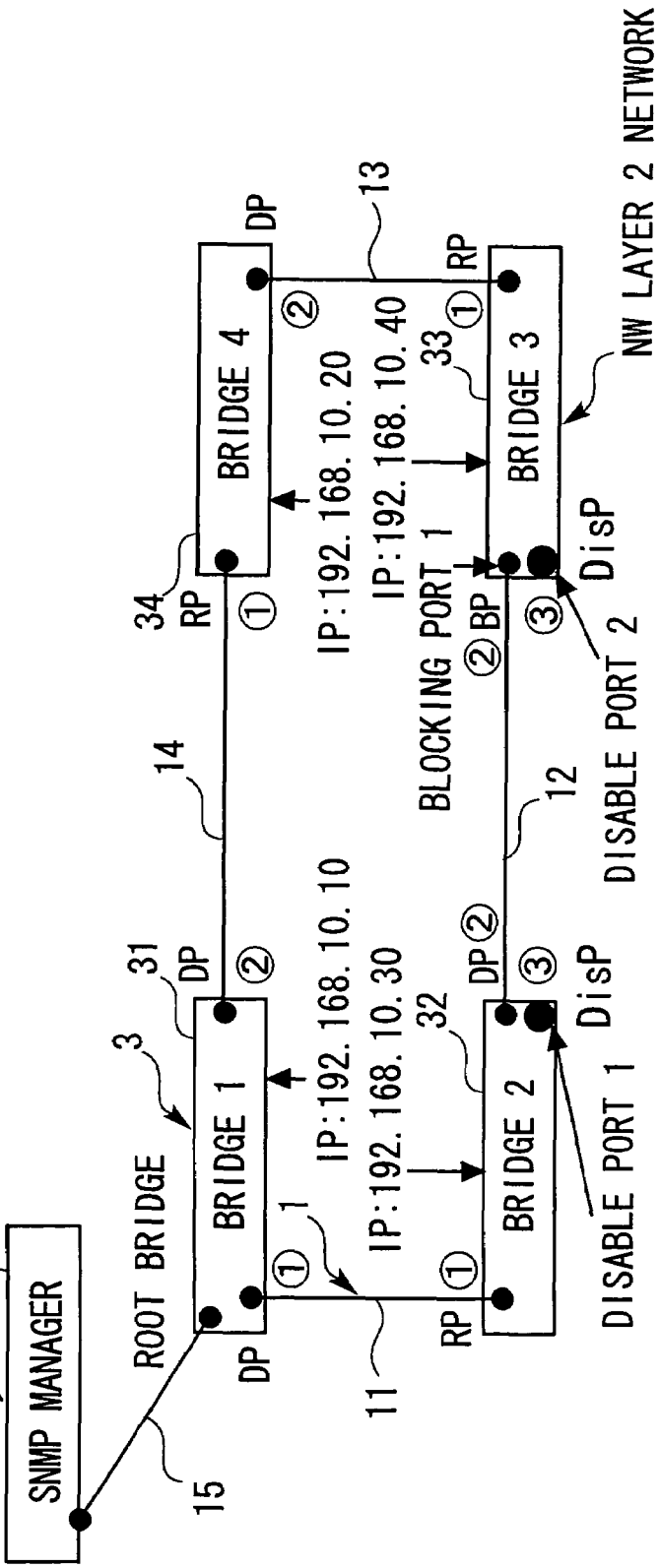
FIG. 8 is a block diagram showing a configuration of a layer 2 loop detection system according to a third embodiment of the present invention.
Figure 9:
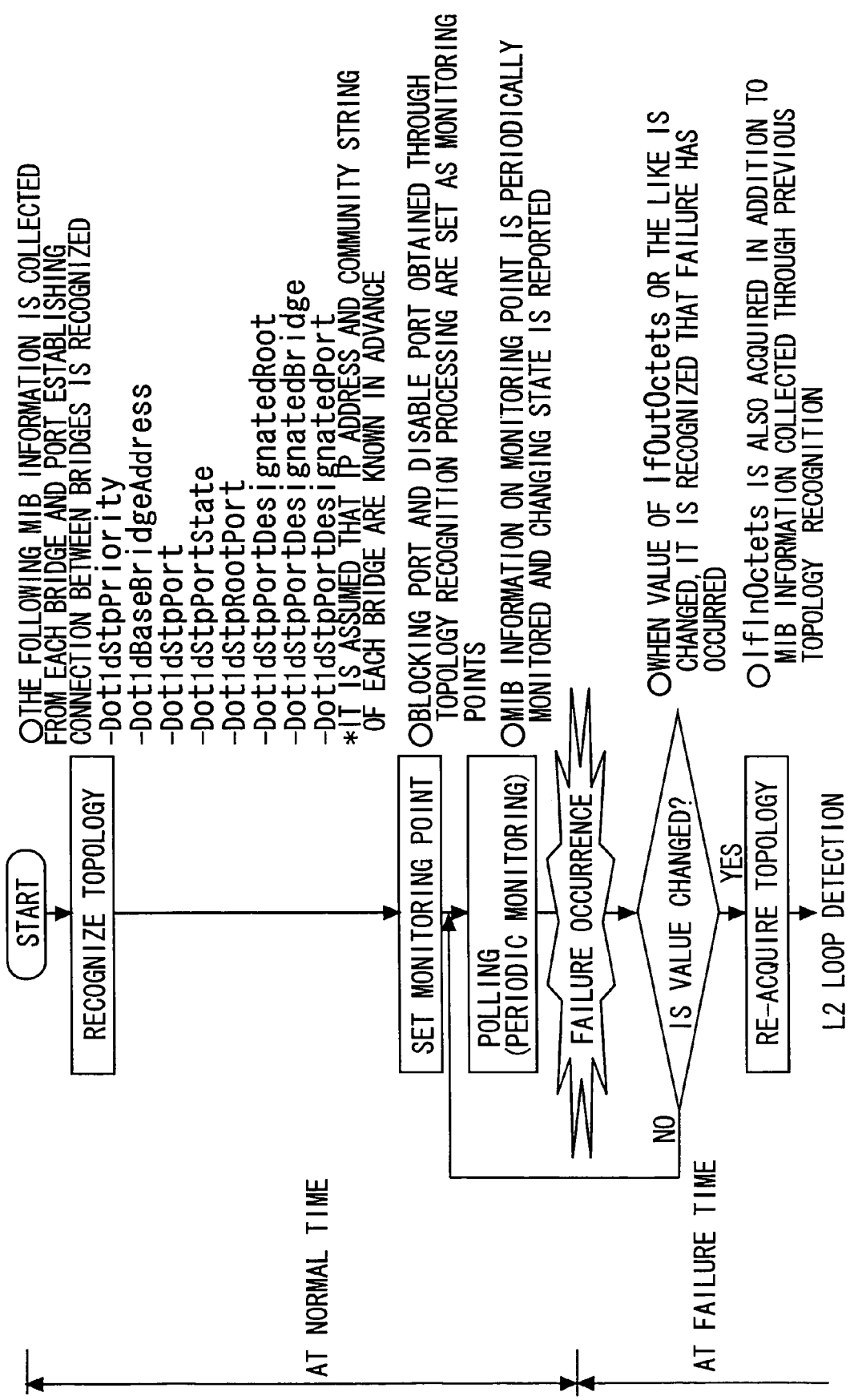
FIG. 9 is an explanatory diagram of L2 loop detection processing in the system according to the third embodiment of the present invention.

Referring to FIG. 8 that shows a configuration of a system in a third embodiment of the present invention, like the system SYS of the first embodiment described above, a layer 2 loop detection system SYS of this embodiment has the manager/agent structure under the SNMP, includes an SNMP manager 2 and multiple agents 3 (31, 32, 33, 34) that are connected to Local Area Networks (LANs) 1 (11, 12, 13, 14, 15) (such as Ethernet networks (Ethernet: registered trademark)) serving as IP networks, and constructs a system having a network management (monitoring) function.

Strictly speaking, the SNMP manager 2 on a management (monitoring) station is an apparatus (such as a personal computer (PC)) on which the SNMP manager has been installed, and constructs an L2 loop detection apparatus in this example. The SNMP manager 2 monitors the LANs 1 and the multiple agents 3 on an L2 network NW that is a management (monitoring) target system. As shown in FIG. 2 that shows a detailed functional construction of the SNMP manager 2, the SNMP manager 2 includes a topology recognition section 21, a port discrimination section 22, a polling section 23, a trigger detection section 24, a topology re-recognition section 25, and a failure determination section 26.

Strictly speaking, the multiple agents 3 constituting the L2 network NW are each an apparatus on which an agent has been installed, and respectively correspond to bridges (1 to 4) 31, 32, 33, and 34 serving as L2 switches in this example. The bridge 31 and the bridge 32 are physically connected to each other through the LAN 11, the bridge 32 and the bridge 33 are physically connected to each other through the LAN 12, the bridge 33 and the bridge 34 are physically connected to each other through the LAN 13, and the bridge 34 and the bridge 31 are physically connected to each other through the LAN 14. Also, the bridge 31 and the SNMP manager 2 are physically connected to each other through the LAN 15. However, as will be described in detail later, the bridge 32 and the bridge 33 are not logically connected to each other through the LAN 12.

The manager 2 in this layer 2 loop detection system SYS is arranged on the LAN 15 connected to the bridge 31, the manager 2 may also be accommodated in another IP network connected to the LAN 15.

(System Operation/Layer 2 Loop Detection Processing)

Next, an operation example in the layer 2 loop detection system SYS of the third embodiment of the present invention shown in FIG. 8 will be described with reference to FIGS. 2, 8, 9, and 10.

In the layer 2 loop detection system SYS having the manager/agent structure described above, the SNMP is a protocol running on the UDP and used to exchange management information between the management station for network management and the management target system. Under this SNMP, in the system SYS of the third embodiment, with respect to a processing request (command) from the SNMP manager 2 on the management station, the bridges 31 to 34 on the L2 network NW that is the management target system informs the manager 2 of management information (response).

By means of such a request/response-based function of the topology recognition section 21, the SNMP manager 2 acquires, in advance, the IP addresses of the monitoring target bridges 31 to 34 (that is, addresses used at the time of designation of a bridge with which it is desired to perform SNMP communication) and community strings of the monitoring target bridges 31 to 34 (that is, character strings (passwords) used to perform SNMP communication with the bridges). In the example shown in FIGS. 8 and 10, the IP addresses of the bridges 31 to 34 are "192. 168. 10. 10", "192. 168. 10. 30", "192. 168. 10. 40", and "192. 168. 10. 20", respectively.

Also, the request/response exchange is performed between the manager 2 and the bridges 31 to 34 in a form of exchange of SNMP messages, although a trap that is an autonomous message among messages under the SNMP is a UDP message that is autonomously (uni-directionally) sent from the bridges 31 to 34 to the manager 2 and is used to inform the manager 2 of the states (congestion, failure, and the like) of the LANs 11 to 14, the states of the bridges 31 to 34, and the like. How this autonomous message "trap" is used will be described in detail later.

In the L2 network NW for constructing an enterprise network or the like, as one technique of securing redundancy of the network by eliminating a loop (layer 2 loop) in which MAC frames are infinitely circulated, the Spanning Tree Protocol (STP) standardized by IEEE 802.1D is caused to run.

Under the STP, packets for monitoring called "BPDU" are exchanged between the bridges 31 to 34 that are each an L2 switch and, when a location at which the network is looped is detected, a port called "blocking port (BP)" that blocks the MAC frames (traffic blocking port) is created, thereby logically blocking the loop. Through this operation, the occurrence of an L2 loop can be avoided.

Also, the STP is a protocol that creates a network configuration (topology) having a tree structure where one bridge called "root bridge" is set as a root. The L2 network NW determines the root bridge through exchange of configuration BPDUs between the bridges 31 to 34 under the STP.

By causing the STP to run in the L2 network NW, only one port of each of the bridges 32 to 34 that is close to the root bridge (bridge 31) (that is, the root) is set as a root port (RP). Also, a port in each of LANs 11 to 14 having the minimum root path cost is set as a designated port (DP) in the LAN. The ports of the root bridge are "0" in root path cost and therefore they each become a designated port DP.

The root ports RP and the designated ports DP are set under a port status (state) "Forwarding" and other ports are set under a port status "Blocking" or "Disable".

As a result, in the L2 network NW, the bridge 31 becomes a root bridge where its first port and second port are each set as a designated port DP. Claim that in FIG. 8, each port number is indicated using a circled number. Also, the first ports of the bridges 32, 33, and 34 each become a root port RP and the second ports of the bridges 32 and 34 each become a designated port DP. A second port of the bridge 33 is originally a designated port DP, although it is set as a blocking port (BP) for the sake of avoidance of the occurrence of an L2 loop. Third ports of the bridges 32 and 33 are each set as a disable port (DisP).

The topology recognition section 21 of the SNMP manager 2 collects MIB information from the bridges 31 to 34 constituting the L2 network NW that is the monitoring target through the bridge (third port thereof) 31 and the LAN 15 by performing SNMP communication. Like in the first embodiment, the MIB information collected by the topology recognition section 21 includes the information (1) to (10).

Also, a list of the MIB information collected by the topology recognition section 21 is shown in FIG. 10. As shown in this drawing, the topology recognition section 21 stores the collected MIB information in a storage section (hard disk) (not shown) by setting the IP addresses and the port numbers of the bridges 31 to 34 as key information.

Based on the collected MIB information, the topology recognition section 21 analyzes that bridge ports having the same values of (7) dot1dStpPortDesignatedBridge and (8) dot1dStpPortDesignatedPort exist adjacent to each other.

Also, the topology recognition section 21 grasps the STP status of each port of the bridges 31 to 34 based on (4) dot1dStpPortState. Among ports having the Forwarding status "5", each port having a port number "1" indicated by (5) dot1dStpRootPort is analyzed as a root port RP and each port having another port number is analyzed as a designated port DP. The topology recognition section 21 analyzes the topology of the L2 network NW through these processing.

Next, the port discrimination section 22 discriminates the blocking port (1) BP with reference to the STP status "2" of each port obtained through the topology recognition processing by the topology recognition section 21, discriminates the disable ports (1, 2) DisP under a port disabled state with reference to the port status "1", and sets each of these ports as a monitoring point. In this example, the second port of the bridge 33 and the third ports of the bridges 32 and 33 are each set as the monitoring point.

The polling section 23 periodically (cyclically) monitors and collects the MIB information on the blocking port (1) BP and the disable ports (1, 2) DisP corresponding to the set monitoring point and informs the trigger detection section 24 of a changing state. When a change of the MIB information on one of the blocking port (1) BP and the disable ports (1, 2) DisP is inputted from the polling section 23, the trigger detection section 24 is triggered to recognize that a failure has occurred and inform the topology re-recognition section 25 of the failure occurrence.

On being informed of the failure occurrence by the trigger detection section 24, the topology re-recognition section 25 re-acquires the MIB information ((4) dot1dStpPortState, (5) dot1dStpRootPort, and (9) ifInOctets in this example) from the bridges 31 to 34 of the L2 network NW that is the monitoring target and updates the STP status of each port, thereby re-analyzing the topology and performing L2 loop detection.

On being informed of this L2 loop detection by the topology re-recognition section 25, the failure determination section 26 recognizes that a failure has occurred in the L2 network NW.

Next, processing by the polling section 23 and the trigger detection section 24 of the SNMP manager 2 will be described in a more specific manner.

In the series of L2 loop detection processing described above, the polling section 23 collects values of (10) ifOutOctets as the MIB information for periodically monitoring the blocking port (1) BP corresponding to the monitoring point and informs the trigger detection section 24 of a changing state so that when traffic (packet) that is equal to or more than an arbitrary threshold value determined by the SNMP manager 2 in advance is transferred from the blocking port (1) BP, the trigger detection section 24 is triggered to recognize that a failure has occurred. Thus, on being triggered to recognize that a failure has occurred, the trigger detection section 24 informs the topology re-recognition section 25 of the failure occurrence. Claim that it is required to set this threshold value so that the trigger detection section 24 will never be triggered by traffic outputted from the blocking port (1) BP at normal time of the L2 network NW.

Also, the polling section 23 collects values of (10) ifOutOctets as the MIB information for periodically monitoring the disable ports (1, 2) DisP corresponding to the monitoring point and informs the trigger detection section 24 of a changing state so that when traffic (packet) is transferred from one of the disable ports (1, 2) DisP, the trigger detection section 24 is triggered to recognize that a failure has occurred. Thus, on being triggered to recognize that a failure has occurred, the trigger detection section 24 informs the topology re-recognition section 25 of the failure occurrence. Claim that a traffic amount is obtained through calculation of a difference from its previous traffic amount by the polling section 23.

Alternatively, in the series of L2 loop detection processing described above, the polling section 23 collects values of (4) dot1dStpPortState as the MIB information for periodically monitoring the blocking port (1) BP and the disable ports (1, 2) DisP corresponding to the monitoring point and informs the trigger detection section 24 of a changing state so that when the port status of the blocking port BP is changed from "Blocking" or when the port status of one of the disable ports (1, 2) DisP is changed from "Disable", the trigger detection section 24 is triggered to recognize that a failure has occurred. Thus, on being triggered to recognize that a failure has occurred, the trigger detection section 24 informs the topology re-recognition section 25 of the failure occurrence.

Still alternatively, in the series of L2 loop detection processing described above, it is also possible to set the polling section 23 and the trigger detection section 24 so that when there occurs an event other than a change of the MIB information for periodically monitoring the blocking port (1) BP and the disable ports (1, 2) DisP corresponding to the monitoring point, the trigger detection section 24 is triggered to recognize that a failure has occurred in the L2 network NW.

More specifically, the polling section 23 and the trigger detection section 24 may be set so that when a topology change trap, out of autonomous messages (traps) sent by the respective bridges 31 to 34, is received, the trigger detection section 24 is triggered to recognize that a failure has occurred. This topology change trap is generated at the time when the port status in the respective bridges 31 to 34 changes from "Learning" to "Forwarding" or from "Forwarding" to "Blocking".

Aside from this, the polling section 23 and the trigger detection section 24 may be set so that when a new root trap, out of autonomous messages (traps) sent by the respective bridges 31 to 34, is received, the trigger detection section 24 is triggered to recognize that a failure has occurred. This new root trap is generated at the time when a new root port RP is selected in each bridge.

Fourth Embodiment (System Configuration)

Figure 11:
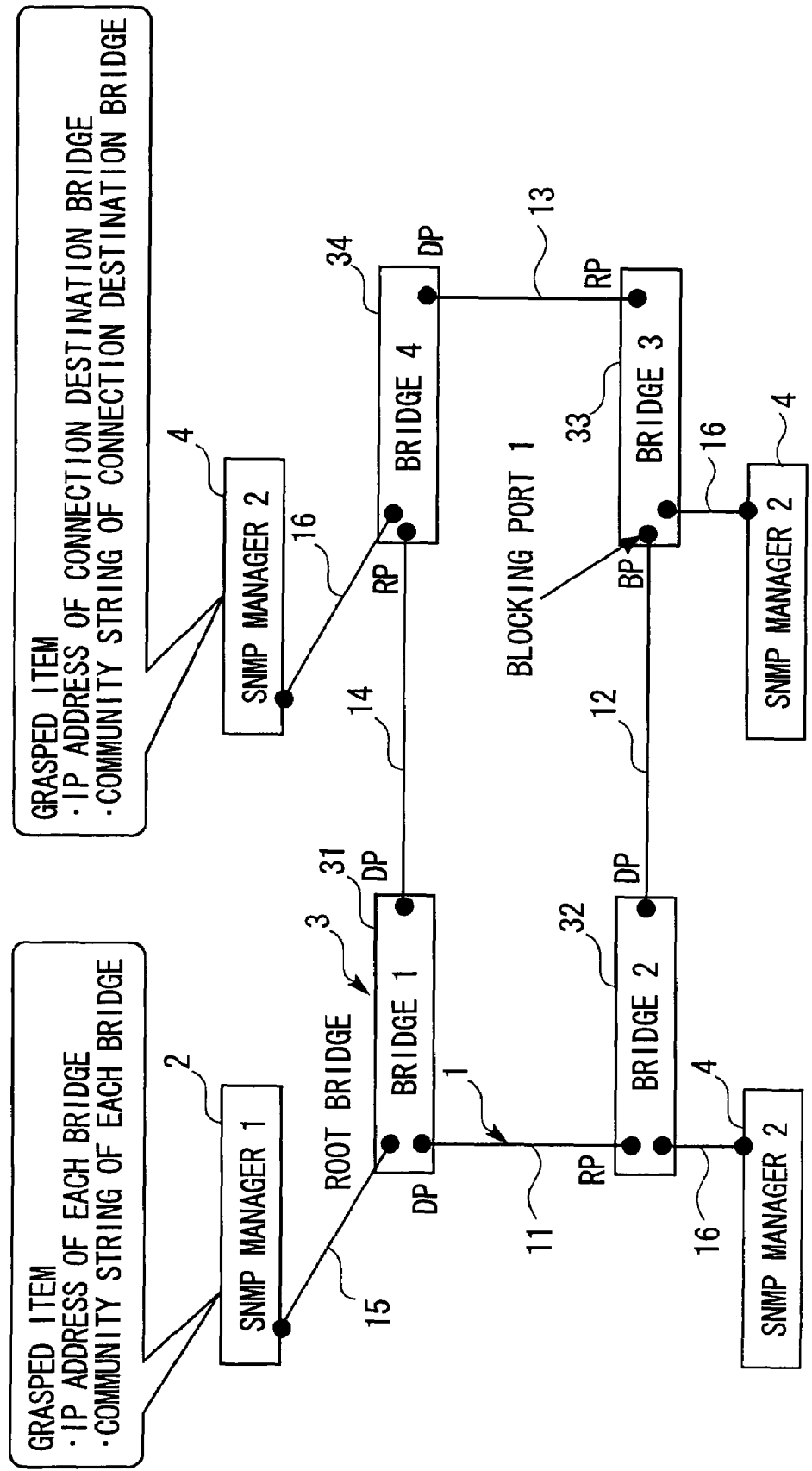
FIG. 11 is a block diagram showing a configuration of a layer 2 loop detection system according to a fourth embodiment of the present invention.

Referring to FIG. 11 that shows a configuration of a system in a fourth embodiment of the present invention, a layer 2 loop detection system SYS of this embodiment has the manager/agent structure under the SNMP as a modification of the system SYS of the first embodiment described above, includes a first SNMP manager 2, second SNMP managers 4, and multiple agents 3 (31, 32, 33, 34) that are each connected to Local Area Networks (LANs) 1 (11, 12, 13, 14, 15, 16) such as Ethernet networks (Ethernet: registered trademark) serving as IP networks, and constructs a system having a network management (monitoring) function.

Strictly speaking, the first SNMP manager (1) 2 and the second SNMP managers (2) 4 on management (monitoring) stations are each an apparatus such as a personal computer (PC), on which the SNMP manager has been installed. In this example, the first SNMP manager (1) 2 constructs an L2 loop detection apparatus. The first SNMP manager (1) 2 monitors the LANs 1 and the multiple agents 3 on an L2 network NW that is a management (monitoring) target system. Also, each second SNMP manager (2) 4 monitors the LAN 1 and its corresponding agent 3 on the L2 network NW that is the management target system. The SNMP manager 2 and 4 each include as shown in FIG. 2 that shows a detailed functional construction thereof a topology recognition section 21, a port discrimination section 22, a polling section 23, a trigger detection section 24, a topology re-recognition section 25, and a failure determination section 26.

Strictly speaking, the multiple agents 3 constituting the L2 network NW are each an apparatus, on which an agent has been installed, and respectively correspond to bridges (1 to 4) 31, 32, 33, and 34 serving as L2 switches in this example. The bridge 31 and the bridge 32 are physically connected to each other through the LAN 11, the bridge 32 and the bridge 33 are physically connected to each other through the LAN 12, the bridge 33 and the bridge 34 are physically connected to each other through the LAN 13, and the bridge 34 and the bridge 31 are physically connected to each other through the LAN 14. Also, the bridge 31 and the SNMP manager 2 are physically connected to each other through the LAN 15. Further, each of the bridges 32, 33, and 34 is physically connected to its corresponding SNMP manager 4 through the LAN 16. However, as will be described in detail later, the bridge 32 and the bridge 33 are not logically connected to each other through the LAN 12.

The managers 2 and 4 in this layer 2 loop detection system SYS are each arranged on the LAN 15 connected to the bridge 31 (third port thereof) or the LAN 16 connected to each of the bridges 32, 33, and 34 (third port thereof), although these managers may also be accommodated in other IP networks connected to the LANs 15 and 16.

Also, it is possible to provide each second SNMP manager 4 as a personal computer, out of many user terminals connected to the respective bridges 32, 33, and 34, on which the SNMP manager has been installed. In this case, the necessity is eliminated to newly prepare terminals for the SNMP managers.

(System Operation/Layer 2 Loop Detection Processing)

Next, an operation example in the layer 2 loop detection system SYS of the fourth embodiment of the present invention shown in FIG. 11 will be described. Claim that so long as it is possible to carry out the present invention without any problems, the description of this operation example will be limited to matters that are different from those in the first embodiment described above. Accordingly, each matter not described in this embodiment is the same as that described in the first embodiment.

In the system SYS of the fourth embodiment, under the SNMP, the SNMP manager 2 on the management station sends a processing request (command) to each bridge 31 to 34 on the L2 network NW that is the management target system, and each bridge 31 to 34 informs the manager 2 of management information (response). Also, each SNMP manager 4 on the management station sends a processing request to its corresponding bridge 32 to 34 on the L2 network NW that is the management target system, and each bridge 32 to 34 informs its corresponding manager 4 of management information.

By means of such a request/response-based function of the topology recognition section 21 (see FIG. 2), the SNMP manager 2 acquires, in advance, the IP addresses of the monitoring target bridges 31 to 34 (that is, addresses used at the time of designation of a bridge with which it is desired to perform SNMP communication) and community strings of the monitoring target bridges 31 to 34 (that is, character strings (passwords) used to perform SNMP communication with the bridges). In a like manner, each SNMP manager 4 acquires, in advance, the IP address and the community string of its corresponding monitoring target bridge 32 to 34. In this example, the IP addresses of the bridges 31 to 34 are "192. 168. 10. 10", "192. 168. 10. 30", "192. 168. 10. 40", and "192. 168. 10. 20", respectively.

The request/response exchange is performed between the manager 2 and the bridges 31 to 34 in a form of exchange of SNMP messages, although a trap that is an autonomous message among messages under the SNMP is a UDP message that is autonomously (uni-directionally) sent from each bridge 31 to 34 to the manager 2 and is used to inform the manager 2 of the states (congestion, failure, and the like) of the LANs 11 to 14, the states of the bridges 31 to 34, and the like.

Also, the request/response exchange is performed between each manager 4 and its corresponding bridge 32 to 34 in a form of exchange of SNMP messages, although a trap that is an autonomous message among messages under the SNMP is a UDP message that is autonomously (uni-directionally) sent from each bridge 32 to 34 to its corresponding manager 4 and is used to inform the manager 4 of the states (congestion, failure, and the like) of the LANs 11 to 14, the states of the bridges 32 to 34, and the like. How this autonomous message "trap" is used will be described in detail later.

The SNMP manager 2 collects the MIB information (the information (1) to (10)) on the respective bridges 31 to 34 and analyzes the topology of the L2 network NW based on the collected information. Then, the SNMP manager 2 performs blocking port BP discrimination only for the bridge 31. If a blocking port BP exists, the SNMP manager 2 periodically monitors the value of (10) ifOutOctets as the MIB information on the port and informs the trigger detection section 24 of a result of the monitoring so that when traffic that is equal to or more than an arbitrary threshold value determined in advance is transferred from the blocking port BP, the trigger detection section 24 is triggered to recognize that a failure has occurred. Claim that it is required to set this threshold value so that the trigger detection section 24 will never be triggered by traffic outputted from the blocking port BP at normal time of the L2 network NW.

Also, each SNMP manager 4 connected to one of the bridges 32, 33, and 34 performs blocking port BP recognition for its corresponding bridge (in this example, the SNMP manager 4 connected to the bridge 33 recognizes the blocking port (1) BP). Then, the SNMP manager 4 periodically monitors the value of (10) ifOutOctets as the MIB information on the port (port 2) and, when traffic that is equal to or more than an arbitrary threshold value determined in advance is transferred from the blocking port BP, sends a topology change trap to the SNMP manager 2.

On receiving the topology change trap from the SNMP manager 4 corresponding to the bridge 33, the SNMP manager 2 informs the trigger detection section 24 of this trap reception. As a result, the trigger detection section 24 is triggered to recognize that a failure has occurred. When doing so, the SNMP manager 2 re-acquires the MIB information (in more detail, (4) dot1dStpPortState, (5) dot1dStpRootPort, and (9) ifInOctet) updates the STP status of each port, and re-analyzes the topology, thereby performing L2 loop detection. With this L2 loop detection processing technique, it becomes possible to suppress the traffic for periodic monitoring from the first SNMP manager 2.

Here, it is possible to modify this embodiment as follows. In the series of L2 loop detection processing described above, the first SNMP manager (1) 2 performs blocking port BP (monitoring point) discrimination only for the bridge 31 and, if a blocking port BP exists, collects the values of (4) dot1dStpPortState as the MIB information for periodically monitoring the port. When the port status of the blocking port BP is changed from "Blocking", the first SNMP manager (1) 2 informs the trigger detection section 24 of this status change and the trigger detection section 24 is triggered to recognize that a failure has occurred.

Aside from this, it is also possible to modify this embodiment as follows. Each second SNMP manager (2) 4 connected to one of the bridges 32, 33, and 34 performs blocking port BP recognition for its corresponding bridge (in this example, the SNMP manager 4 connected to the bridge 33 recognizes the blocking port (1) BP) and periodically monitors the value of (4) dot1dStpPortState as the MIB information on the port. When the port status of the blocking port (1) BP is changed from"Blocking", the second SNMP manager (2) 4 sends a topology change trap to the SNMP manager 2. On receiving the topology change trap from the SNMP manager 4 corresponding to the bridge 33, the SNMP manager 2 informs the trigger detection section 24 of this trap reception and the trigger detection section 24 is triggered to recognize that a failure has occurred.

Fifth Embodiment (System Configuration)

Figure 12:
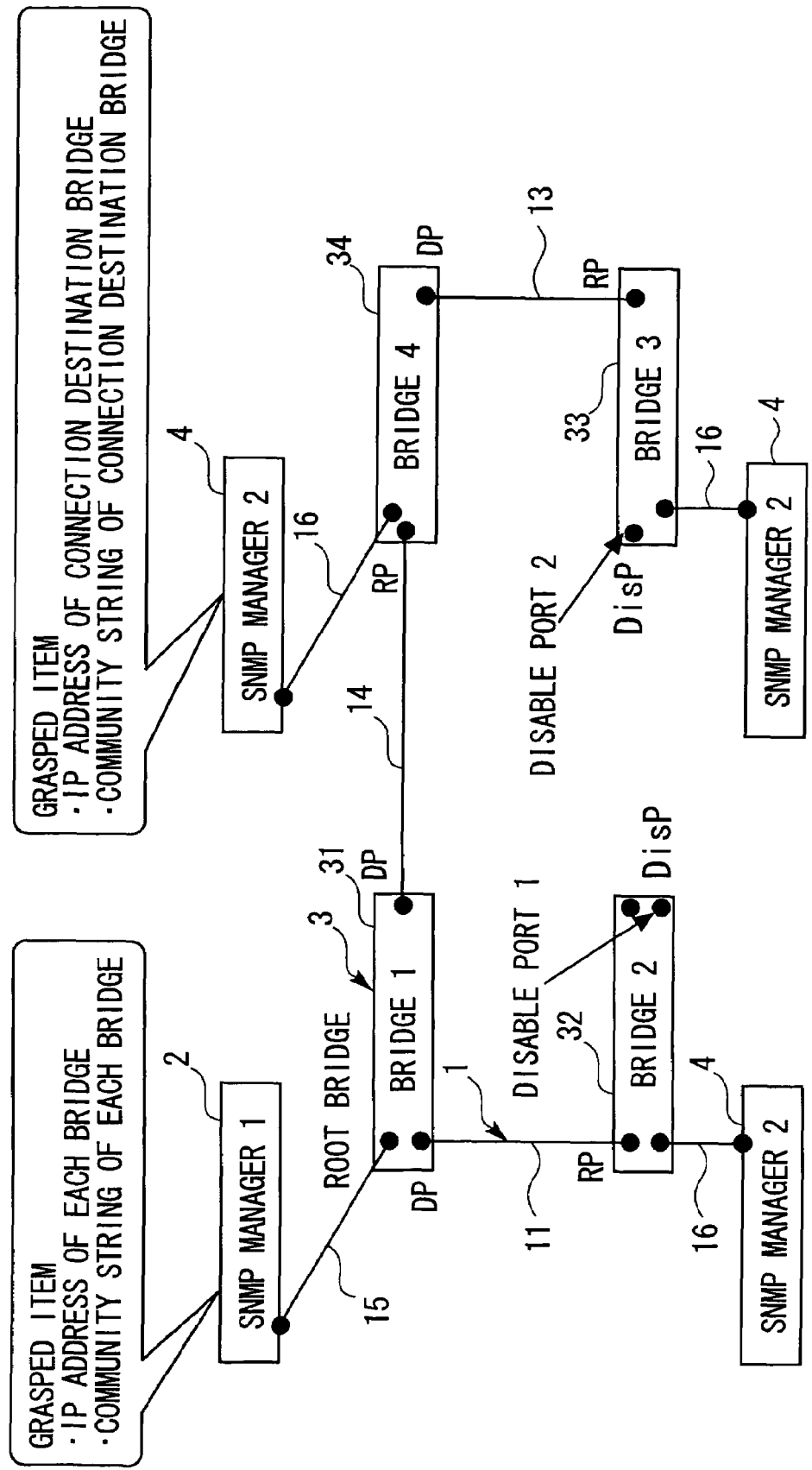
FIG. 12 is a block diagram showing a configuration of a layer 2 loop detection system according to a fifth embodiment of the present invention.

Referring to FIG. 12 that shows a configuration of a system in a fifth embodiment of the present invention that is a modification of the system SYS of the second embodiment described above, a layer 2 loop detection system SYS of this embodiment has the manager/agent structure under the SNMP, includes SNMP managers 2 and 4 and multiple agents 3 (31, 32, 33, 34) that are each connected to Local Area Networks (LANs) 1 (11, 12, 13, 14, 15, 16) (such as Ethernet networks (Ethernet: registered trademark)) serving as IP networks, and constructs a system having a network management (monitoring) function.

Strictly speaking, the first SNMP manager (1) 2 and the second SNMP managers (2) 4 on management (monitoring) stations are each an apparatus (such as a personal computer (PC)), on which the SNMP manager has been installed. In this example, the first SNMP manager (1) 2 constructs an L2 loop detection apparatus. The first SNMP manager (1) 2 monitors the LANs 1 and the multiple agents 3 on an L2 network NW that is a management (monitoring) target system. Also, each second SNMP manager (2) 4 monitors the LAN 1 and its corresponding agent 3 on the L2network NW that is the management target system. As shown in FIG. 2 that shows a detailed functional construction of each SNMP manager 2, 4, each SNMP manager includes a topology recognition section 21, a port discrimination section 22, a polling section 23, a trigger detection section 24, a topology re-recognition section 25, and a failure determination section 26.

Strictly speaking, the multiple agents 3 constituting the L2 network NW are each an apparatus, on which an agent has been installed, and respectively correspond to bridges (1 to 4) 31, 32, 33, and 34 serving as L2 switches in this example. The bridge 31 and the bridge 32 are physically connected to each other through the LAN 11, the bridge 32 and the bridge 33 are physically connected to each other through the LAN 12, the bridge 33 and the bridge 34 are physically connected to each other through the LAN 13, and the bridge 34 and the bridge 31 are physically connected to each other through the LAN 14. Also, the bridge 31 and the SNMP manager 2 are physically connected to each other through the LAN 15. Further, each of the bridges 32, 33, and 34 is physically connected to its corresponding SNMP manager 4 through the LAN 16. However, as will be described in detail later, the bridge 32 and the bridge 33 are not logically connected to each other through the LAN 12.

The managers 2 and 4 in this layer 2 loop detection system SYS are each arranged on the LAN 15 connected to the bridge 31 (third port thereof) or the LAN 16 connected to one of the bridges 32, 33, and 34 (third port thereof), although these managers may also be accommodated in other IP networks connected to the LANs 15 and 16.

Also, it is possible to provide each second SNMP manager 4 as a personal computer, out of many user terminals connected to the respective bridges 32, 33, and 34, on which the SNMP manager has been installed. In this case, the necessity is eliminated to newly prepare terminals for the SNMP managers.

(System Operation/Layer 2 Loop Detection Processing)

Next, an operation example in the layer 2 loop detection system SYS of the fifth embodiment of the present invention shown in FIG. 12 will be described. Claim that so long as it is possible to carry out the present invention without any problems, the description of this operation example will be limited to matters that are different from those in the second embodiment described above. Accordingly, each matter not described in this embodiment is the same as that described in the second embodiment.

In the system SYS of the fifth embodiment, under the SNMP, the SNMP manager 2 on the management station sends a processing request (command) to each bridge 31 to 34 on the L2 network NW that is the management target system, and each bridge 31 to 34 informs the manager 2 of management information (response). Also, each SNMP manager 4 on the management station sends a processing request to its corresponding bridge 32 to 34 on the L2 network NW that is the management target system, and each bridge 32 to 34 informs its corresponding manager 4 of management information.

By means of such a request/response-based function of the topology recognition section 21 (see FIG. 2), the SNMP manager 2 acquires, in advance, the IP addresses of the monitoring target bridges 31 to 34 (that is, addresses used at the time of designation of a bridge with which it is desired to perform SNMP communication) and community strings of the monitoring target bridges 31 to 34 (that is, character strings (passwords) used to perform SNMP communication with the bridges). In a like manner, each SNMP manager 4 acquires, in advance, the IP address and the community string of its corresponding monitoring target bridge 32 to 34. In this example, the IP addresses of the bridges 31 to 34 are "192. 168. 10. 10", "192. 168. 10. 30", "192. 168. 10. 40", and "192. 168. 10. 20", respectively.

The request/response exchange is performed between the manager 2 and the bridges 31 to 34 in a form of exchange of SNMP messages, although a trap that is an autonomous message among messages under the SNMP is a UDP message that is autonomously (uni-directionally) sent from each bridge 31 to 34 to the manager 2 and is used to inform the manager 2 of the states (congestion, failure, and the like) of the LANs 11 to 14, the states of the bridges 31 to 34, and the like.

Also, the request/response exchange is performed between each manager 4 and its corresponding bridge 32 to 34 in a form of exchange of SNMP messages, although a trap that is an autonomous message among messages under the SNMP is a UDP message that is autonomously (uni-directionally) sent from each bridge 32 to 34 to its corresponding manager 4 and is used to inform the manager 4 of the states (congestion, failure, and the like) of the LANs 11 to 14, the states of the bridges 32 to 34, and the like. How this autonomous message "trap" is used will be described in detail later.

The SNMP manager 2 collects the MIB information (the information (1) to (10)) on the respective bridges 31 to 34 and analyzes the topology of the L2 network NW based on the collected information. Then, the SNMP manager 2 performs blocking port BP discrimination only for the bridge 31. If no blocking port BP exists, the SNMP manager 2 then performs disable port (1, 2) DisP discrimination. If the disable ports (1, 2) DisP exist, the SNMP manager 2 periodically monitors the value of (10) ifOutOctets as the MIB information on the ports and informs the trigger detection section 24 of a result of the monitoring so that when traffic is transferred from one of the disable ports (1, 2) DisP, the trigger detection section 24 is triggered to recognize that a failure has occurred.

Also, each SNMP manager 4 connected to one of the bridges 32, 33, and 34 performs blocking port BP discrimination for its corresponding bridge. If no blocking port BP exists, each SNMP manager 4 then performs disable port (1, 2) DisP recognition (in this example, the SNMP managers 4 connected to the bridges 32 and 33 each recognize the disable ports (1, 2) DisP) and periodically monitors the value of (10) ifOutOctets as the MIB information on the ports (ports 2). When traffic is transferred from one of the disable ports (1, 2) DisP, its corresponding SNMP manager 4 sends a topology change trap to the SNMP manager 2.

On receiving the topology change trap from one of the SNMP managers 4 corresponding to the bridges 32 and 33, the SNMP manager 2 informs the trigger detection section 24 of this trap reception. As a result, the trigger detection section 24 is triggered to recognize that a failure has occurred. When doing so, the SNMP manager 2 re-acquires the MIB information (in more detail, (4) dot1dStpPortState, (5) dot1dStpRootPort, and (9) ifInOctet), updates the STP status of each port, and re-analyzes the topology, thereby performing L2 loop detection. With this L2 loop detection processing technique, it becomes possible to suppress the traffic for periodic monitoring from the first SNMP manager 2.

Here, it is possible to modify this embodiment as follows. In the series of L2 loop detection processing described above, the first SNMP manager (1) 2 performs disable port DisP (monitoring point) discrimination only for the bridge 31 and, if a disable port DisP exists, collects the values of (4) dot1dStpPortState as the MIB information for periodically monitoring the port. When the port status of the disable port DisP is changed from "Disable", the first SNMP manager (1) 2 informs the trigger detection section 24 of this status change and the trigger detection section 24 is triggered to recognize that a failure has occurred.

Aside from this, it is also possible to modify this embodiment as follows. Each second SNMP manager (2) 4 connected to one of the bridges 32, 33, and 34 performs disable port DisP recognition for its corresponding bridge (in this example, the SNMP managers 4 connected to the bridges 32 and 33 recognize the disable ports (1, 2) DisP) and periodically monitors the value of (4) dot1dStpPortState as the MIB information on the ports. When the port status of one of the disable ports (1, 2) DisP is changed from "Disable", the second SNMP manager (2) 4 corresponding to the disable port DisP sends a topology change trap to the SNMP manager 2. On receiving the topology change trap from the SNMP manager 4 corresponding to the bridge 33, the SNMP manager 2 informs the trigger detection section 24 of this trap reception and the trigger detection section 24 is triggered to recognize that a failure has occurred.

Sixth Embodiment (System Configuration)

Figure 13:
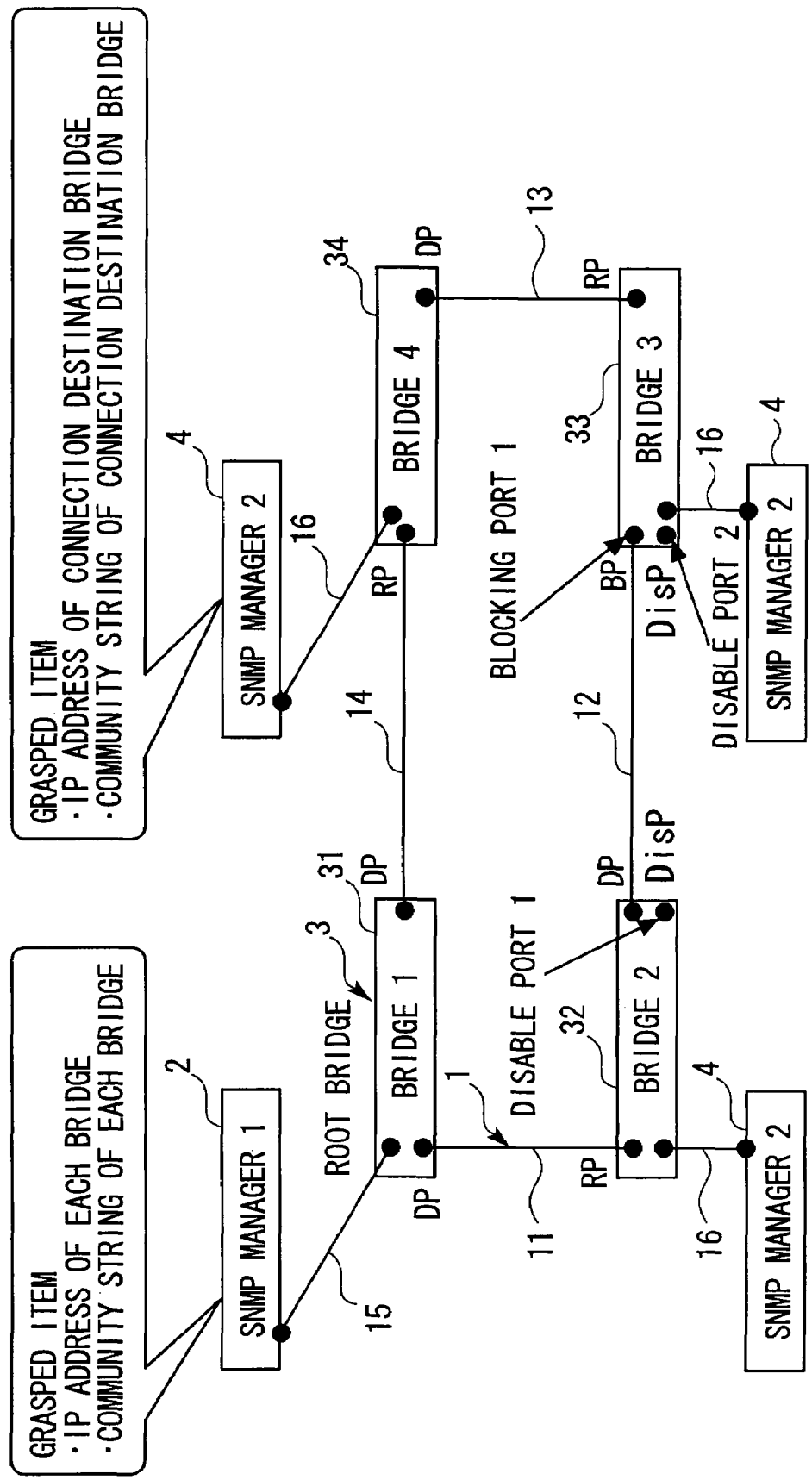
FIG. 13 is a block diagram showing a configuration of a layer 2 loop detection system according to a sixth embodiment of the present invention.

Referring to FIG. 13 that shows a configuration of a system in a sixth embodiment of the present invention that is a modification of the system SYS of the third embodiment described above, a layer 2 loop detection system SYS of this embodiment has the manager/agent structure under the SNMP, includes SNMP managers 2 and 4 and multiple agents 3 (31, 32, 33, 34) that are connected to Local Area Networks (LANs) 1 (11, 12, 13, 14, 15, 16) (such as Ethernet networks (Ethernet: registered trademark)) serving as IP networks, and constructs a system having a network management (monitoring) function.

Strictly speaking, the first SNMP manager (1) 2 and the second SNMP managers (2) 4 on management (monitoring) stations are each an apparatus (such as a personal computer (PC)), on which the SNMP manager has been installed. In this example, the first SNMP manager (1) 2 constructs an L2 loop detection apparatus. The first SNMP manager (1) 2 monitors the LANs 1 and the multiple agents 3 on an L2 network NW that is a management (monitoring) target system. Also, each second SNMP manager (2) 4 monitors the LAN 1 and its corresponding agent 3 on the L2 network NW that is the management target system. As shown in FIG. 2 that shows a detailed functional construction of each SNMP manager 2/4, each SNMP manager includes a topology recognition section 21, a port discrimination section 22, a polling section 23, a trigger detection section 24, a topology re-recognition section 25, and a failure determination section 26.

Strictly speaking, the multiple agents 3 constituting the L2 network NW are each an apparatus, on which an agent has been installed, and respectively correspond to bridges (1 to 4) 31, 32, 33, and 34 serving as L2 switches in this example. The bridge 31 and the bridge 32 are physically connected to each other through the LAN 11, the bridge 32 and the bridge 33 are physically connected to each other through the LAN 12, the bridge 33 and the bridge 34 are physically connected to each other through the LAN 13, and the bridge 34 and the bridge 31 are physically connected to each other through the LAN 14. Also, the bridge 31 and the SNMP manager 2 are physically connected to each other through the LAN 15. Further, each of the bridges 32, 33, and 34 is physically connected to its corresponding SNMP manager 4 through the LAN 16. However, as will be described in detail later, the bridge 32 and the bridge 33 are not logically connected to each other through the LAN 12.

The managers 2 and 4 in this layer 2 loop detection system SYS are each arranged on the LAN 15 connected to the bridge 31 (third port thereof) or the LAN 16 connected to one of the bridges 32, 33, and 34 (third or fourth port thereof), although these managers may also be accommodated in other IP networks connected to the LANs 15 and 16.

Also, it is possible to provide each second SNMP manager 4 as a personal computer, out of many user terminals connected to the respective bridges 32, 33, and 34, on which the SNMP manager has been installed. In this case, the necessity is eliminated to newly prepare terminals for the SNMP managers.

(System Operation/Layer 2 Loop Detection Processing)

Next, an operation example in the layer 2 loop detection system SYS of the sixth embodiment of the present invention shown in FIG. 13 will be described. Claim that so long as it is possible to carry out the present invention without any problems, the description of this operation example will be limited to matters that are different from those in the third embodiment described above. Accordingly, each matter not described in this embodiment is the same as that described in the third embodiment.

In the system SYS of the sixth embodiment, under the SNMP, the SNMP manager 2 on the management station sends a processing request (command) to each bridge 31 to 34 on the L2 network NW that is the management target system, and each bridge 31 to 34 informs the manager 2 of management information (response). Also, each SNMP manager 4 on the management station sends a processing request to its corresponding bridge 32 to 34 on the L2 network NW that is the management target system, and each bridge 32 to 34 informs its corresponding manager 4 of management information.

By means of such a request/response-based function of the topology recognition section 21 (see FIG. 2), the SNMP manager 2 acquires, in advance, the IP addresses of the monitoring target bridges 31 to 34 (that is, addresses used at the time of designation of a bridge with which it is desired to perform SNMP communication) and community strings of the monitoring target bridges 31 to 34 (that is, character strings (passwords) used to perform SNMP communication with the bridges). In a like manner, each SNMP manager 4 acquires, in advance, the IP address and the community string of its corresponding monitoring target bridge 32 to 34. In this example, the IP addresses of the bridges 31 to 34 are "192. 168. 10. 10", "192. 168. 10. 30", "192. 168. 10. 40", and "192. 168. 10. 20", respectively.

The request/response exchange is performed between the manager 2 and the bridges 31 to 34 in a form of exchange of SNMP messages, although a trap that is an autonomous message among messages under the SNMP is a UDP message that is autonomously (uni-directionally) sent from each bridge 31 to 34 to the manager 2 and is used to inform the manager 2 of the states (congestion, failure, and the like) of the LANs 11 to 14, the states of the bridges 31 to 34, and the like.

Also, the request/response exchange is performed between each manager 4 and its corresponding bridge 32 to 34 in a form of exchange of SNMP messages, although a trap that is an autonomous message among messages under the SNMP is a UDP message that is autonomously (uni-directionally) sent from each bridge 32 to 34 to its corresponding manager 4 and is used to inform the manager 4 of the states (congestion, failure, and the like) of the LANs 11 to 14, the states of the bridges 32 to 34, and the like. How this autonomous message "trap" is used will be described in detail later.

The SNMP manager 2 collects the MIB information (the information (1) to (10)) on the respective bridges 31 to 34 and analyzes the topology of the L2 network NW based on the collected information. Then, the SNMP manager 2 performs blocking port BP or disable port DisP discrimination only for the bridge 31. If a blocking port BP or a disable port DisP exists, the SNMP manager 2 periodically monitors the value of (10) ifOutOctets as the MIB information on the port and informs the trigger detection section 24 of a result of the monitoring so that when traffic that is equal to or more than an arbitrary threshold value determined in advance is transferred from the blocking port BP or traffic is transferred from the disable port DisP, the trigger detection section 24 is triggered to recognize that a failure has occurred. Claim that it is required to set this threshold value so that the trigger detection section 24 will never be triggered by traffic outputted from the blocking port BP at normal time of the L2 network NW.

Also, each SNMP manager 4 connected to one of the bridges 32, 33, and 34 performs blocking port BP recognition for its corresponding bridge (in this example, the SNMP manager 4 connected to the bridge 33 recognizes the blocking port (1) BP) Then, the SNMP manager 4 periodically monitors the value of (10) ifOutOctets as the MIB information on the port (port 2) and, when traffic that is equal to or more than an arbitrary threshold value determined in advance is transferred from the blocking port (1) BP, sends a topology change trap to the SNMP manager 2.

Also, each SNMP manager 4 connected to one of the bridges 32, 33, and 34 performs disable port DisP recognition for its corresponding bridge (in this example, the SNMP managers 4 connected to the bridges 32 and 33 recognize the disable ports (1, 2) DisP). Then, the SNMP manager 4 periodically monitors the value of (10) ifOutOctets as the MIB information on the ports (ports 3) and, when traffic is transferred from one of the disable ports (1, 2) DisP, sends a topology change trap to the SNMP manager 2.

On receiving the topology change trap from one of the SNMP managers 4 corresponding to the bridges 32 and 33, the SNMP manager 2 informs the trigger detection section 24 of this trap reception. As a result, the trigger detection section 24 is triggered to recognize that a failure has occurred. When doing so, the SNMP manager 2 re-acquires the MIB information (in more detail, (4) dot1dStpPortState, (5) dot1dStpRootPort, and (9) ifInOctets), updates the STP status of each port, and re-analyzes the topology, thereby performing L2 loop detection. With this L2 loop detection processing technique, it becomes possible to suppress the traffic for periodic monitoring from the first SNMP manager 2.

Here, it is possible to modify this embodiment as follows. In the series of L2 loop detection processing described above, the first SNMP manager (1) 2 performs blocking port BP and disable port DisP (monitoring point) discrimination only for the bridge 31 and, if a blocking port BP or a disable port DisP exists, collects the values of (4) dot1dStpPortState as the MIB information for periodically monitoring the port. When the port status of the blocking port BP is changed from "Blocking" or the port status of the disable port DisP is changed from "Disable", the first SNMP manager (1) 2 informs the trigger detection section 24 of this status change and the trigger detection section 24 is triggered to recognize that a failure has occurred.

Aside from this, it is also possible to modify this embodiment as follows. Each second SNMP manager (2) 4 connected to one of the bridges 32, 33, and 34 performs blocking port BP and disable port DisP recognition for its corresponding bridge (in this example, the SNMP manager 4 connected to the bridge 33 recognizes the blocking port (1) BP and the SNMP managers 4 connected to the bridges 32 and 33 recognizes the disable ports (1, 2) DisP) and periodically monitors the value of (4) dot1dStpPortState as the MIB information on the port. Following this, when the port status of the blocking port (1) BP is changed from "Blocking" or the port status of one of the disable ports (1, 2) DisP is changed from "Disable", the SNMP manager 4 corresponding to the port sends a topology change trap to the SNMP manager 2. On receiving the topology change trap from any one of the SNMP managers 4 corresponding to the bridges 32 and 33, the SNMP manager 2 informs the trigger detection section 24 of this trap reception and the trigger detection section 24 is triggered to recognize that a failure has occurred.

Seventh Embodiment

Next, a layer 2 loop detection system SYS of a seventh embodiment of the present invention will be described. Claim that so long as it is possible to carry out the present invention without any problems, the description of the seventh embodiment will be limited to matters that are different from those in the first embodiment described above. Accordingly, each matter not described in this embodiment is the same as that described in the first embodiment. In addition, the invention described in the seventh embodiment is also applicable to the layer 2 loop detection systems SYS described in the second to sixth embodiments.

(First MIB Information Collection Method)

Figure 14:
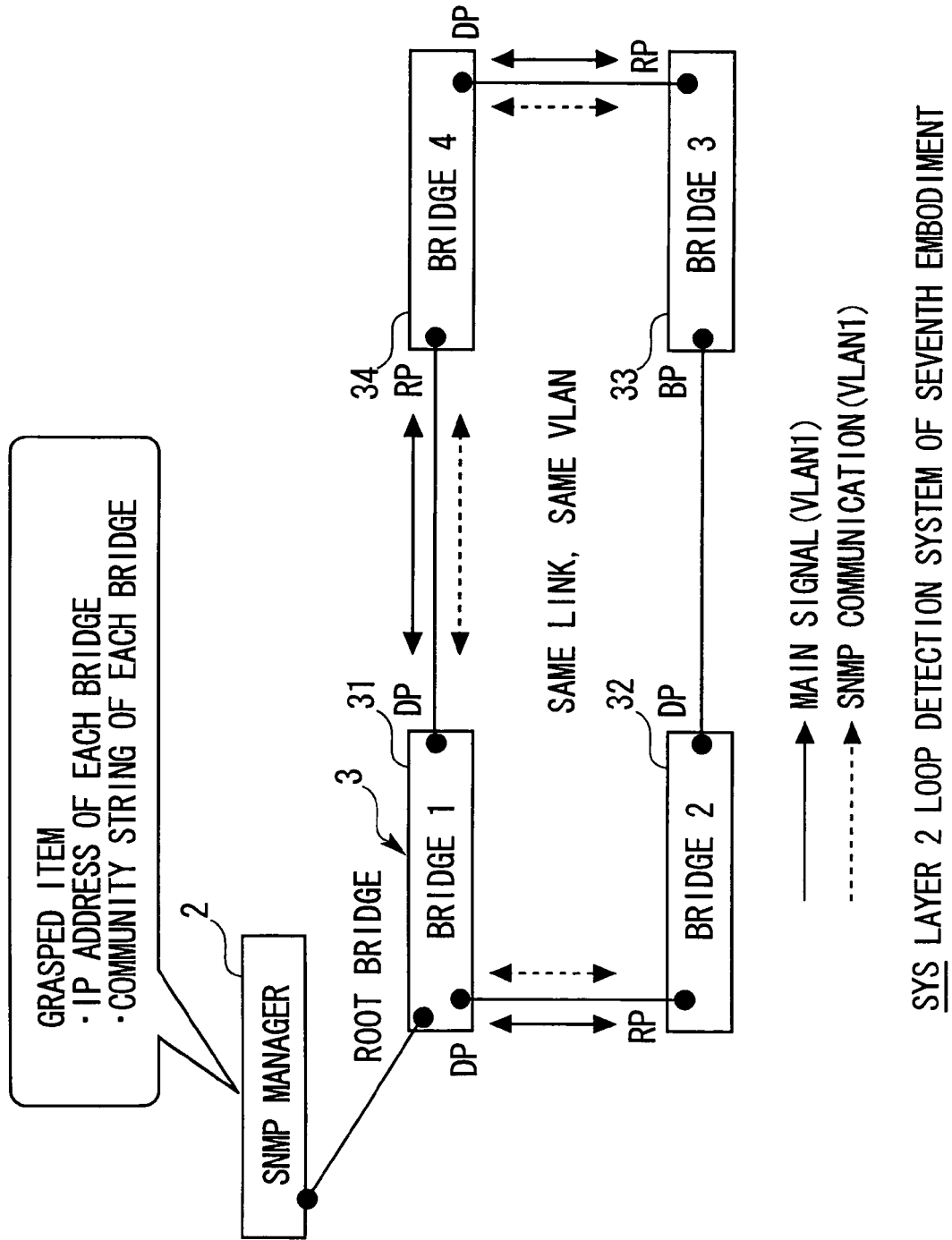
FIG. 14 is a block diagram showing a configuration of a first layer 2 loop detection system according to a seventh embodiment of the present invention.

In a layer 2 loop detection system SYS shown in FIG. 14, the polling section 23 of the SNMP manager 2 on the management station (see FIG. 2) periodically (cyclically) monitors and collects the MIB information on the blocking port (1) BP corresponding to the monitoring point and informs the trigger detection section 24 of a changing state. In this example, the second port of the bridge 33 is set as the monitoring point.

When a change of the MIB information on the blocking port (1) BP is inputted from the polling section 23, the trigger detection section 24 of the SNMP manager 2 is triggered to recognize that a failure has occurred and inform the topology re-recognition section 25 of the failure occurrence.

On being informed of the failure occurrence from the trigger detection section 24, the topology re-recognition section 25 re-acquires the MIB information ((4) dot1dStpPortState, (5) dot1dStpRootPort, and (9) ifInOctets, in this example) from the bridges 31 to 34 of the L2 network NW that is the monitoring target and updates the STP status of each port, thereby re-analyzing the topology and performing L2 loop detection.

On being informed of the L2 loop detection from the topology re-recognition section 25, the failure determination section 26 recognizes that a failure has occurred in the L2 network NW.

The SNMP manager 2 of this layer 2 loop detection system SYS collects (acquires) the MIB information used in the L2 loop detection processing by performing SNMP communication in an in-band manner. That is, the SNMP manager 2 performs the SNMP communication for the MIB information collection through a Virtual Local Area Network (VLAN) (1) that is provided on the same physical link as that for main signal (MAC frame) transmission in a LAN 1 constituting the L2 network NW and is the same logical path as that for the main signal transmission.

Here, in FIG. 14, each solid line arrow indicates the VLAN (1) that is the logical path for the main signal transmission and each dotted line arrow indicates the VLAN (1) that is the logical path for the MIB information transmission.

With this construction, the SNMP manager 2 becomes capable of collecting the MIB information using the path of the main signal system, meaning that no monitoring path is newly required.

(Second MIB Information Collection Method)

In a layer 2 loop detection system SYS shown in FIG. 15, in place of the first MIB information collection method described above, the SNMP manager 2 on the management station uses a second MIB information collection method with which the SNMP manager 2 performs the SNMP communication for the MIB information collection through a VLAN (2) that is provided on the same physical link as that for the main signal (MAC frame) transmission in the LAN 1 constituting the L2 network NW and is a different logical path from that for the main signal transmission.

Here, in FIG. 15, each solid line arrow indicates the VLAN (1) that is the logical path for the main signal transmission and each dotted line arrow indicates the VLAN (2) that is the logical path for the MIB information transmission.

With this construction, the SNMP manager 2 becomes capable of acquiring the MIB information without any influences of the main signals.

(Third MIB Information Collection Method)

In a layer 2 loop detection system SYS shown in FIG. 16, in place of the first MIB information collection method described above, the SNMP manager 2 on the management station uses a third MIB information collection method with which the SNMP manager 2 performs the SNMP communication for the MIB information collection through a VLAN (2) that is provided on a different physical link from that for the main signal (MAC frame) transmission in the LAN 1 constituting the L2 network NW and is a different logical path from that for the main signal transmission.

Here, in FIG. 16, each solid line arrow indicates the VLAN (1) that is the logical path for the main signal transmission and each dotted line arrow indicates the VLAN (2) that is the logical path for the MIB information transmission.

With this construction, the SNMP manager 2 becomes capable of acquiring the MIB information without any influences of the main signals.

(Fourth MIB Information Collection Method)

In a layer 2 loop detection system SYS shown in FIG. 17, in place of the first MIB information collection method described above, the SNMP manager 2 uses a fourth MIB information collection method with which the SNMP manager 2 collects (acquires) the MIB information used in the L2 loop detection processing by performing the SNMP communication in an out-band manner. That is, the SNMP manager 2 performs the SNMP communication for the MIB information collection through another LAN 1A that is a different network from that for the main signal (MAC frame) transmission in the LAN 1 constituting the L2 network NW.

Here, in FIG. 17, each solid line arrow indicates the VLAN (1) that is a logical path on the network for the main signal transmission and each dotted line arrow indicates a logical path on the network for the MIB information transmission.

Also, switches SW constituting the network for the MIB information transmission are each an L2 switch such as a bridge or a hub. Each L2 switch SW is connected to one of the bridges 31 to 34 and the L2 switch SW corresponding to the root bridge 31 is connected to the SNMP manager 2.

With this construction, the SNMP manager 2 becomes capable of acquiring the MIB information without any influences of the main signals.

Eighth Embodiment

Next, a layer 2 loop detection system SYS of an eighth embodiment of the present invention will be described. Claim that so long as it is possible to carry out the present invention without any problems, the description of this eighth embodiment will be limited to matters that are different from those in the first embodiment described above. Accordingly, each matter not described in this embodiment is the same as that described in the first embodiment. In addition, the invention described in this eighth embodiment is also applicable to the layer 2 loop detection systems SYS described in the second to sixth embodiments.

(First L2 Loop Detection Method)

In a layer 2 loop detection system SYS shown in FIG. 18, when a failure (CPU failure) has occurred in the bridge 32 constituting the L2 network NW and no response of the SNMP communication for the MIB information collection by the SNMP manager 2 (not shown) connected to the root bridge (bridge 31) is received, if a port 1 (bridge 31) and a port 2 (bridge 33) connected to the bridge 32 are not root ports RP and their port statuses are "Forwarding" (that is, if they are each a designated port DP), the SNMP manager 2 detects that an L2 loop attributable to the bridge 32 has occurred.

That is, in this layer 2 loop detection system SYS, when a bridge that MIB information cannot be collected exists in the L2 network NW, a loop location is detected by detecting that every port of other bridges connected to the bridge is a designated port DP. In other words, by identifying that every opposing port connected to a bridge from which no SNMP communication response is received is a designated port DP, a loop location at which a failure has occurred is identified.

(Second L2 Loop Detection Method)

In a layer 2 loop detection system SYS shown in FIG. 19, when a failure has occurred in a first port (1) of the root bridge (bridge 31) constituting the L2 network NW, if the first port (1) of the bridge 31 and a second port (2) of the bridge 32 are not root ports RP, are under the port status "Forwarding", and oppose each other (that is, if they are each a designated port DP), it is detected that an L2 loop attributable to these ports (1, 2) has occurred.

That is, in this layer 2 loop detection system SYS, a loop location is estimated by detecting a link of the LAN 1 that both ends are each a designated port DP.

(Third L2 Loop Detection Method)

In the layer 2 loop detection system SYS shown in FIG. 18 or 19, the SNMP manager 2 refers to the values of (9) ifInOctets among the MIB information on the ports (1, 2) at the estimated L2 loop occurrence location and detects that traffic flows into these ports, thereby identifying an L2 loop location.

That is, in this layer 2 loop detection system SYS, a loop location is identified by collecting the MIB information at the estimated loop location and detecting that traffic flows to each contradictory port.

(Fourth L2 Loop Detection Method)

In the layer 2 loop detection system SYS shown in FIG. 18 or 19, the SNMP manager 2 estimates that a bridge failure or a link failure has occurred by detecting that traffic does not flow into the ports (1, 2) at the estimated L2 loop occurrence location while referring to the values of (9) ifInOctets among the MIB information on the ports (1, 2).

That is, in this layer 2 loop detection system SYS, by collecting the MIB information at the estimated loop location and detecting that traffic does not flow to each contradictory port, it is estimated that an L2 switch failure or a link failure has occurred.

(Fifth L2 Loop Detection Method)

In a layer 2 loop detection system SYS shown in FIG. 20, the SNMP manager 2 identifies the location of an L2 loop in the same manner as in the case of the third L2 loop detection method described above, and then changes the MIB information (ifAdminstatus) only on a second port (2) of the bridge 33 from "up" to "down" through SNMP communication, thereby setting the port (2) as a disable port (port blocking). In this manner, the occurrence of a loop is prevented.

That is, in this layer 2 loop detection system SYS, after contradictory adjacent ports are identified, the MIB information on a certain port out of the contradictory ports is changed from "up" to "down" through SNMP communication, thereby preventing the occurrence of a loop.

(Sixth L2 Loop Detection Method)

In a layer 2 loop detection system SYS shown in FIG. 21, the SNMP manager 2 identifies the location of an L2 loop in the same manner as in the case of the third L2 loop detection method described above, and then changes the MIB information (ifAdminstatus) on a first port (1) of the bridge 31 and a second port (2) of the bridge 33 from "up" to "down" through SNMP communication, thereby setting these ports (1, 2) as disable ports (port blocking) and preventing the occurrence of a loop.

That is, in this layer 2 loop detection system SYS, after contradictory adjacent ports are identified, the MIB information on every contradictory port is changed from "up" to "down" through SNMP communication, thereby preventing the occurrence of a loop.

[Modification]

It is possible to provide the processing described above in each embodiment in the form of a program that can be executed by a computer. In this case, it is possible to provide the processing through a recording medium, such as a CD-ROM or a flexible disk, or through a communication line. In addition, arbitrary ones or all of the processing described in the respective embodiments may be selected and implemented in combination.

What is claimed is:

1. A layer 2 loop detection apparatus using a Simple Network Management Protocol (SNMP) manager that monitoring target is a layer 2 network having a plurality of layer 2 switches, comprising:

a unit recognizing a topology of the layer 2 network at normal time by collecting Management Information Base (MIB) information including information concerning ports of the plurality of layer 2 switches from the plurality of layer 2 switches through SNMP communication;

a unit discriminating, based on the topology recognition processing, a blocking port for traffic blocking set under a Spanning Tree Protocol (STP);

a unit setting the discriminated blocking port as a monitoring point and periodically monitoring a state thereof; and a unit performing detection of a layer 2 loop by re-collecting a part of the MIB information from the plurality of layer 2 switches through SNMP communication and re-recognizing the topology of the layer 2 network, the detection of the layer 2 loop being triggered by a change of the state of the blocking port;

wherein at a time when a part of the MIB information is re-collected through the SNMP communication, if the MIB information cannot be collected from one of the plurality of layer 2 switches, a location of the layer 2 loop is detected by detecting that every port connected to the layer 2 switch is set as a designated port.

2. A layer 2 loop detection apparatus according to claim 1, wherein the MIB information on the blocking port is periodically monitored as the state of the monitoring point and the detection of the layer 2 loop is triggered by transfer of traffic from the blocking port.

3. A layer 2 loop detection apparatus according to claim 1, wherein the MIB information on the blocking port is periodically monitored as a state of the monitoring point and the detection of the layer 2 loop is triggered by a change of a port status of the blocking port.

4. A layer 2 loop detection apparatus according to claim 1, wherein the detection of the layer 2 loop is triggered by reception of a topology change trap autonomously sent from the plurality of layer 2 switches.

5. A layer 2 loop detection apparatus according to claim 1, wherein the detection of the layer 2 loop is triggered by reception of a new port trap autonomously sent from the plurality of layer 2 switches.

6. A layer 2 loop detection apparatus according to claim 1, wherein the plurality of layer 2 switches each comprise a bridge, and the layer 2 network comprises an Ethernet network.

7. A layer 2 loop detection apparatus according to claim 1, wherein the location of the layer 2 loop is identified by collecting the MIB information at the detected location of the layer 2 loop and detecting that traffic flows to a contradictory port.

8. A layer 2 loop detection apparatus according to claim 7, wherein occurrence of the layer 2 loop is prevented by changing, after contradictory adjacent ports are identified, the MIB information on a part or all of contradictory ports from "up" to "down" (up-down) through SNMP communication.

9. A layer 2 loop detection apparatus according to claim 1, wherein occurrence of a failure in the layer 2 switches or the link is estimated by collecting the MIB information at the detected location of the layer 2 loop and detecting that traffic does not flow to a contradictory port.

10. A layer 2 loop detection apparatus using a Simple Network Management Protocol (SNMP) manager that monitoring target is a layer 2 network having a plurality of layer 2 switches, comprising:
a unit recognizing a topology of the layer 2 network at normal time by collecting Management Information Base (MIB) information including information concerning ports of the plurality of layer 2 switches from the plurality of layer 2 switches through SNMP communication;
a unit discriminating a disable port under a port disable state, when a blocking port for traffic blocking set under a Spanning Tree Protocol (STP) cannot be identified based on the topology recognition processing;
a unit setting the discriminated disable port as a monitoring point and periodically monitoring a state thereof; and
a unit detection of a performing layer 2 loop by re-collecting a part of the MIB information from the plurality of layer 2 switches through SNMP communication and re-recognizing the topology of the layer 2 network, the detection of the layer 2 loop being triggered by a change of the state of the disable port;
wherein at a time when a part of the MIB information is re-collected through the SNMP communication, if the MIB information cannot be collected from one of the plurality of layer 2 switches, a location of the layer 2 loop is detected by detecting that every port connected to the layer 2 switch is set as a designated port.

11. A layer 2 loop detection apparatus according to claim 10, wherein the MIB information on the disable port is periodically monitored as a state of the monitoring point and the detection of the layer 2 loop is triggered by transfer of traffic from the disable port.

12. A layer 2 loop detection apparatus according to claim 10, wherein the MIB information on the disable port is periodically monitored as a state of the monitoring point and the detection of the layer 2 loop is triggered by a change of a port status of the disable port.

13. A layer 2 loop detection apparatus using a Simple Network Management Protocol (SNMP) manager that monitoring target is a layer 2 network having a plurality of layer 2 switches, comprising:
a unit recognizing a topology of the layer 2 network at normal time by collecting Management Information Base (MIB) information including information concerning ports of the plurality of layer 2 switches from the plurality of layer 2 switches through SNMP communication;
a unit discriminating, based on the topology recognition processing, a blocking port for traffic blocking and a disable port under a port disabled state each set under a Spanning Tree Protocol (STP);
a unit setting the discriminated blocking port and the discriminated disable port as a monitoring point and periodically monitoring a state thereof; and
a unit performing detection of a layer 2 loop by re-collecting a part of the MIB information from the plurality of layer 2 switches through SNMP communication and re-recognizing the topology of the layer 2 network, the detection of the layer 2 loop being triggered by a change of the state of one of the blocking port and the disable port;
wherein at a time when a part of the MIB information is re-collected through the SNMP communication, if the MIB information cannot be collected from one of the plurality of layer 2 switches, a location of the layer 2 loop is detected by detecting that every port connected to the layer 2 switch is set as a designated port.

14. A layer 2 loop detection apparatus according to claim 13, wherein the MIB information on the blocking port and the disable port is periodically monitored as a state of the monitoring point and the detection of the layer 2 loop is triggered by transfer of traffic from one of the blocking port and the disable port.

15. A layer 2 loop detection apparatus according to claim 14, wherein the MIB information on one of the blocking port and the disable port comprises information described in a script language "ifOutOctets" and indicating a total number of bytes sent from a port of an SNMP communication target.

16. A layer 2 loop detection apparatus according to claim 14, wherein the MIB information on one of the blocking port and the disable port comprises information described in a script language "dot1dStpPortState" and indicating a value of a status of a port of an SNMP communication target.

17. A layer 2 loop detection apparatus according to claim 13, wherein the MIB information on the blocking port and the disable port is periodically monitored as a state of the monitoring point and the detection of the layer 2 loop is triggered by a change of a port status of one of the blocking port and the disable port.

18. A layer 2 loop detection apparatus using a Simple Network Management Protocol (SNMP) manager that monitoring target is a layer 2 network having a plurality of layer 2 switches, comprising:

- a unit recognizing a topology of the layer 2 network at normal time by collecting Management Information Base (MIB) information including information concerning ports of the plurality of layer 2 switches from the plurality of layer 2 switches through SNMP communication;
- a unit discriminating, based on the topology recognition processing, a blocking port for traffic blocking set under a Spanning Tree Protocol (STP);
- a unit setting the discriminated blocking port as a monitoring point and periodically monitoring a state thereof; and
- a unit performing detection of a layer 2 loop by re-collecting a part of the MIB information from the plurality of layer 2 switches through SNMP communication and re-recognizing the topology of the layer 2 network, the detection of the layer 2 loop being triggered by a change of the state of the blocking port;
- wherein at a time when a part of the MIB information is re-collected through the SNMP communication, a location of the layer 2 loop is estimated by detecting a link that both ends are each set as a designated port.

19. A layer 2 loop detection apparatus using a Simple Network Management Protocol (SNMP) manager that monitoring target is a layer 2 network having a plurality of layer 2 switches, comprising:

- a unit recognizing a topology of the layer 2 network at normal time by collecting Management Information Base (MIB) information including information concerning ports of the plurality of layer 2 switches from the plurality of layer 2 switches through SNMP communication;
- a unit discriminating a disable port under a port disable state, when a blocking port for traffic blocking set under a Spanning Tree Protocol (STP) cannot be identified based on the topology recognition processing;
- a unit setting the discriminated disable port as a monitoring point and periodically monitoring a state thereof; and
- a unit detection of a performing layer 2 loop by re-collecting a part of the MIB information from the plurality of layer 2 switches through SNMP communication and re-recognizing the topology of the layer 2 network, the detection of the layer 2 loop being triggered by a change of the state of the disable port;
- wherein at a time when a part of the MIB information is re-collected through the SNMP communication, a location of the layer 2 loop is estimated by detecting a link that both ends are each set as a designated port.

20. A layer 2 loop detection apparatus using a Simple Network Management Protocol (SNMP) manager that monitoring target is a layer 2 network having a plurality of layer 2 switches, comprising:

- a unit recognizing a topology of the layer 2 network at normal time by collecting Management Information Base (MIB) information including information concerning ports of the plurality of layer 2 switches from the plurality of layer 2 switches through SNMP communication;
- a unit discriminating, based on the topology recognition processing, a blocking port for traffic blocking and a disable port under a port disabled state each set under a Spanning Tree Protocol (STP);
- a unit setting the discriminated blocking port and the discriminated disable port as a monitoring point and periodically monitoring a state thereof; and
- a unit performing detection of a layer 2 loop by re-collecting a part of the MIB information from the plurality of layer 2 switches through SNMP communication and re-recognizing the topology of the layer 2 network, the detection of the layer 2 loop being triggered by a change of the state of one of the blocking port and the disable port;
- wherein at a time when a part of the MIB information is re-collected through the SNMP communication, a location of the layer 2 loop is estimated by detecting a link that both ends are each set as a designated port.

* * * * *